US011007761B2

(12) United States Patent
Ben-Daat et al.

(10) Patent No.: US 11,007,761 B2
(45) Date of Patent: May 18, 2021

(54) METHOD OF MAKING COEXTRUDED, CROSS-LINKED POLYOLEFIN FOAM WITH TPU CAP LAYERS

(71) Applicant: TORAY PLASTICS (AMERICA), INC., N. Kingstown, RI (US)

(72) Inventors: Dan Ben-Daat, Winchester, VA (US); Jesse Baldwin, Strasburg, VA (US); Kaitlyn Michelle Bock, Winchester, VA (US); Pawel Sieradzki, Cross Junction, VA (US)

(73) Assignee: TORAY PLASTICS (AMERICA), INC., N. Kingstown, RI (US)

( * ) Notice: Subject to any disclaimer, the term of this patent is extended or adjusted under 35 U.S.C. 154(b) by 155 days.

(21) Appl. No.: 15/476,660

(22) Filed: Mar. 31, 2017

(65) Prior Publication Data

US 2018/0281260 A1 Oct. 4, 2018

(51) Int. Cl.
*B29C 48/21* (2019.01)
*B32B 27/32* (2006.01)
(Continued)

(52) U.S. Cl.
CPC .......... *B32B 27/32* (2013.01); *B29C 35/0866* (2013.01); *B29C 44/505* (2016.11); *B29C 48/08* (2019.02); *B29C 48/21* (2019.02); *B29C 71/04* (2013.01); *B32B 5/02* (2013.01); *B32B 5/145* (2013.01); *B32B 5/18* (2013.01); *B32B 5/20* (2013.01); *B32B 5/32* (2013.01); *B32B 7/12* (2013.01); *B32B 9/025* (2013.01); *B32B 9/046* (2013.01); *B32B 27/065* (2013.01); *B32B 27/08* (2013.01); *B32B 27/12* (2013.01); *B32B 27/16* (2013.01); *B32B 27/18* (2013.01);
(Continued)

(58) Field of Classification Search
CPC . B29C 44/24; B29C 47/0042; B29C 48/0012; B29C 48/21
See application file for complete search history.

(56) References Cited

U.S. PATENT DOCUMENTS 4,203,815 A 5/1980 Noda et al.
4,410,602 A 10/1983 Komoda et al.
(Continued)

FOREIGN PATENT DOCUMENTS

CN 1356620 A 7/2002
CN 1584248 2/2005
(Continued)

OTHER PUBLICATIONS

Ben-Daat et al, Office Action dated Jan. 10, 2019, directed to U.S. Appl. No. 15/476,681; 14 pages.
(Continued)

*Primary Examiner* — James Sanders
(74) *Attorney, Agent, or Firm* — Morrison & Foerster LLP

(57) ABSTRACT

The present disclosure is directed to a physically cross-linked, closed cell continuous multilayer foam structure comprising at least one foam polypropylene/polyethylene layer with a TPU cap layer. The multilayer foam structure can be obtained by coextruding a multilayer structure comprising at least one foam composition layer with at least one cap composition layer, irradiating the coextruded structure with ionizing radiation, and continuously foaming the irradiated structure.

18 Claims, 4 Drawing Sheets

(51) Int. Cl.

| | |
|---|---|
| *B29C 71/04* | (2006.01) |
| *B32B 5/20* | (2006.01) |
| *B32B 27/06* | (2006.01) |
| *B32B 5/18* | (2006.01) |
| *B32B 7/12* | (2006.01) |
| *B32B 5/02* | (2006.01) |
| *B32B 27/18* | (2006.01) |
| *B32B 27/12* | (2006.01) |
| *B32B 9/02* | (2006.01) |
| *B32B 27/20* | (2006.01) |
| *B32B 9/04* | (2006.01) |
| *B32B 27/30* | (2006.01) |
| *B32B 27/40* | (2006.01) |
| *B32B 5/32* | (2006.01) |
| *B32B 27/16* | (2006.01) |
| *B29C 35/08* | (2006.01) |
| *B32B 5/14* | (2006.01) |
| *B32B 27/26* | (2006.01) |
| *E04F 15/20* | (2006.01) |
| *B29C 44/50* | (2006.01) |
| *B32B 27/08* | (2006.01) |
| *B29C 48/08* | (2019.01) |
| *B29K 23/00* | (2006.01) |
| *B29K 75/00* | (2006.01) |
| *B29K 105/04* | (2006.01) |
| *B29L 9/00* | (2006.01) |
| *B29C 48/00* | (2019.01) |
| *B29C 44/24* | (2006.01) |
| *B29K 105/24* | (2006.01) |
| *B29K 105/00* | (2006.01) |
| *B29L 31/00* | (2006.01) |
| *B29C 44/56* | (2006.01) |

(52) U.S. Cl.
CPC .............. *B32B 27/20* (2013.01); *B32B 27/26* (2013.01); *B32B 27/304* (2013.01); *B32B 27/40* (2013.01); *E04F 15/203* (2013.01); *B29C 44/24* (2013.01); *B29C 44/5636* (2013.01); *B29C 48/0012* (2019.02); *B29C 2035/0872* (2013.01); *B29K 2023/06* (2013.01); *B29K 2023/12* (2013.01); *B29K 2075/00* (2013.01); *B29K 2105/0088* (2013.01); *B29K 2105/041* (2013.01); *B29K 2105/046* (2013.01); *B29K 2105/24* (2013.01); *B29K 2995/0063* (2013.01); *B29K 2995/0097* (2013.01); *B29L 2009/00* (2013.01); *B29L 2031/732* (2013.01); *B32B 2250/02* (2013.01); *B32B 2250/03* (2013.01); *B32B 2250/04* (2013.01); *B32B 2250/05* (2013.01); *B32B 2266/025* (2013.01); *B32B 2266/0278* (2013.01); *B32B 2266/08* (2013.01); *B32B 2270/00* (2013.01); *B32B 2274/00* (2013.01); *B32B 2307/51* (2013.01); *B32B 2307/72* (2013.01); *B32B 2307/732* (2013.01); *B32B 2323/04* (2013.01); *B32B 2323/10* (2013.01); *B32B 2375/00* (2013.01); *B32B 2471/00* (2013.01)

(56) References Cited

U.S. PATENT DOCUMENTS

| | | | |
|---|---|---|---|
| 4,614,680 A | 9/1986 | Fry et al. | |
| 5,118,561 A | 6/1992 | Gusavage et al. | |
| 5,276,082 A | 1/1994 | Forry et al. | |
| 5,462,794 A | 10/1995 | Lindemann et al. | |
| 5,552,448 A | 9/1996 | Kobayashi et al. | |
| 5,594,038 A | 1/1997 | Kobayashi et al. | |
| 5,605,660 A | 2/1997 | Buongiomo et al. | |
| 5,605,961 A | 2/1997 | Lee et al. | |
| 5,646,194 A | 7/1997 | Kobayashi et al. | |
| 5,668,217 A | 9/1997 | Clark | |
| 5,738,922 A | 4/1998 | Kobayashi et al. | |
| 5,721,315 A | 7/1998 | Evans et al. | |
| 5,783,630 A | 7/1998 | Evans et al. | |
| 5,928,776 A | 7/1999 | Shioya et al. | |
| 5,942,576 A | 8/1999 | Evans et al. | |
| 5,959,032 A | 9/1999 | Evans et al. | |
| 5,965,667 A | 10/1999 | Evans et al. | |
| 5,985,999 A | 11/1999 | Dominguez et al. | |
| 6,031,048 A | 2/2000 | Evans et al. | |
| 6,090,862 A | 7/2000 | Tatsuda et al. | |
| 6,093,496 A | 7/2000 | Dominguez et al. | |
| 6,093,773 A | 7/2000 | Evans et al. | |
| 6,127,480 A | 10/2000 | Dominguez et al. | |
| 6,140,416 A | 10/2000 | Evans et al. | |
| 6,146,574 A * | 11/2000 | Henkee | C08L 23/10 264/241 |
| 6,187,424 B1 | 2/2001 | Kjellqvist et al. | |
| 6,214,914 B1 | 4/2001 | Evans et al. | |
| 6,218,023 B1 | 4/2001 | DeNicola, Jr. et al. | |
| 6,251,319 B1 | 6/2001 | Tusim et al. | |
| 6,306,964 B1 | 10/2001 | Evans et al. | |
| 6,420,482 B1 | 7/2002 | Dominguez et al. | |
| 6,465,606 B2 | 10/2002 | Evans et al. | |
| 6,537,404 B1 | 3/2003 | Ishiwatari et al. | |
| 6,586,482 B2 | 7/2003 | Gehlsen et al. | |
| 6,586,489 B2 | 7/2003 | Gehlsen et al. | |
| 6,593,380 B2 | 7/2003 | Gehlsen et al. | |
| 6,638,985 B2 | 10/2003 | Gehlsen et al. | |
| 6,875,484 B1 | 4/2005 | Kogure et al. | |
| 6,949,283 B2 | 9/2005 | Kollaja et al. | |
| 7,083,849 B1 | 8/2006 | Albrecht et al. | |
| 7,582,352 B2 | 9/2009 | Kobayashi et al. | |
| 7,655,296 B2 | 2/2010 | Haas et al. | |
| 7,820,282 B2 | 10/2010 | Haas et al. | |
| 7,879,441 B2 | 2/2011 | Gehlsen et al. | |
| 8,404,780 B2 | 3/2013 | Weaver et al. | |
| 9,663,958 B2 | 5/2017 | Baldwin et al. | |
| 9,669,600 B2 | 6/2017 | Baldwin et al. | |
| 2002/0119281 A1 | 8/2002 | Higgins et al. | |
| 2003/0219582 A1 | 11/2003 | Ramesh et al. | |
| 2003/0232210 A1 | 12/2003 | Haas et al. | |
| 2004/0229968 A1 | 11/2004 | Dontula et al. | |
| 2005/0159496 A1 | 7/2005 | Bambara et al. | |
| 2006/0276581 A1 | 12/2006 | Ratzsch et al. | |
| 2007/0287003 A1 | 12/2007 | Matsumura et al. | |
| 2009/0029144 A1 | 1/2009 | Borgsten et al. | |
| 2009/0263645 A1 | 10/2009 | Barger et al. | |
| 2010/0215879 A1 | 8/2010 | Dooley et al. | |
| 2010/0266799 A1 | 10/2010 | Koonce et al. | |
| 2010/0286357 A1 | 11/2010 | Matsumura et al. | |
| 2011/0014835 A1 | 1/2011 | Sieradzki et al. | |
| 2011/0244206 A1 | 10/2011 | Penache et al. | |
| 2012/0220682 A1 | 8/2012 | Jacob | |
| 2012/0295086 A1 | 11/2012 | Baldwin et al. | |
| 2014/0061967 A1 | 3/2014 | Stanhope et al. | |
| 2014/0070442 A1 | 3/2014 | Morita et al. | |
| 2014/0170344 A1 | 6/2014 | Pramanik et al. | |
| 2014/0272380 A1 | 9/2014 | Chapman | |
| 2015/0174871 A1 | 6/2015 | Sollmann et al. | |
| 2015/0183142 A1 | 7/2015 | Baldwin et al. | |
| 2015/0184400 A1 * | 7/2015 | Baldwin et al. | E04F 15/181 428/220 |
| 2016/0185025 A1 | 6/2016 | Baldwin et al. | |
| 2016/0185079 A1 | 6/2016 | Baldwin et al. | |
| 2016/0185080 A1 | 6/2016 | Baldwin et al. | |
| 2016/0362578 A1 | 12/2016 | Reynoso Gomez | |
| 2017/0225431 A1 | 8/2017 | Baldwin et al. | |
| 2017/0246839 A1 | 8/2017 | Baldwin et al. | |
| 2018/0126617 A1 | 5/2018 | Baldwin et al. | |
| 2018/0134005 A1 | 5/2018 | Baldwin et al. | |
| 2018/0281358 A1 | 10/2018 | Ben-Daat et al. | |
| 2019/0002662 A1 | 1/2019 | Baldwin et al. | |

(56) References Cited

U.S. PATENT DOCUMENTS

| | | | |
|---|---|---|---|
| 2020/0307039 A1 | 10/2020 | Ben-Daat et al. | |
| 2020/0307151 A1 | 10/2020 | Ben-Daat et al. | |

FOREIGN PATENT DOCUMENTS

| | | | |
|---|---|---|---|
| CN | 1894317 A | 1/2007 | |
| CN | 101522983 A | 9/2009 | |
| CN | 201405548 Y | 2/2010 | |
| CN | 1854126 | 12/2010 | |
| CN | 101899183 A | 12/2010 | |
| CN | 102007000 A | 4/2011 | |
| CN | 102753329 A | 10/2012 | |
| CN | 102996913 A | 3/2013 | |
| CN | 101735763 | 7/2013 | |
| CN | 102858859 | 3/2014 | |
| CN | 103619553 A | 3/2014 | |
| CN | 103756124 A | 4/2014 | |
| CN | 103849004 | 6/2014 | |
| CN | 105484373 A | 4/2016 | |
| CN | 106163792 A | 11/2016 | |
| DE | 4127409 A1 | 2/1993 | |
| DE | 102012202804 A1 | 8/2013 | |
| EP | 0679487 A1 | 11/1995 | |
| EP | 719626 | 7/1996 | |
| EP | 1066958 | 1/2001 | |
| EP | 0745641 B1 | 3/2004 | |
| EP | 1449869 | 8/2004 | |
| EP | 1664169 | 5/2009 | |
| JP | 59-215329 | 12/1984 | |
| JP | H2-59335 A | 2/1990 | |
| JP | 7-258445 | 10/1995 | |
| JP | 8-52781 A | 2/1996 | |
| JP | 9-132661 | 5/1997 | |
| JP | 11-302425 | 11/1999 | |
| JP | 2000-37766 | 2/2000 | |
| JP | 2005-519178 A | 6/2005 | |
| JP | 2007-277417 | 10/2007 | |
| KR | 10-2015-0126431 A | 11/2015 | |
| WO | 96/27485 | 9/1996 | |
| WO | 03/076497 A2 | 9/2003 | |
| WO | 2009/057131 | 5/2009 | |
| WO | 2011/008845 | 1/2011 | |
| WO | 2013/057737 | 4/2013 | |
| WO | 2014/049792 | 4/2014 | |
| WO | WO 2016/109544 | 7/2016 | |

OTHER PUBLICATIONS

Wang et al (2006). "Polyurethane/Polyolefin Blends: Morphology, Compatibilization and Mechanical Properties," Polymers and Polymer Composites 14 (1): 1-11.

Extended European Search Report dated Sep. 4, 2018, directed to European Application No. 18164262.0; 8 pages.

Extended European Search Report dated Sep. 4, 2018, directed to European Application No. 18164260.4; 8 pages.

Lu, Q.-W. et al. (2003) "Promoting Adhesion to Thermoplastic Polyurethane (TPU) By Amine Functional Polypropylenes," Polym. Mater. Sci. Engr. 89; 2 pages.

Lu, Qi-Wei et al. (2003) "Compatibilized Blends of Thermoplastic Polyurethane (TPU) and Polypropylene," Macromol. Symp. 198; 12 pages.

Lu, Qi-Wei et al. (2004) "Comparing the compatibility of various functionalized polypropylenes with thermoplastic polyurethane (TPU)," Polymer 45; 11 pages.

Lu, Q.-W. et al. (2005) "Melt Amination of Polypropylenes," J.Polym.Sci.A, 43;16 pages.

"The JEFFAMINE Polyetheramines," (May 2007) technical brochure published by Huntsman Corporation; 6 pages.

"Modification of Polyolefins with Elastamine Polyetheramines," (Oct. 2009) technical brochure published by Huntsman Corporation; 3 pages.

Song, Jie et al. (2011) "Flow Accelerates Adhesion Between Functional Polyethylene and Polyurethane," AIChE Journal, vol. 57, No. 12; 11 pages.

Kobayashi, Shingo et al. (2011) "Amino-Functionalized Polyethylene for Enhancing the Adhesion between Polyolefins and Polyurethanes," Ind. Eng. Chem. Res. 50(6); 6 pages.

Baldwin et al., U.S. Office Action dated Jun. 6, 2017, directed to U.S. Appl. No. 14/586,721; 5 pages.

Baldwin et al., U.S. Office Action dated Apr. 5, 2018, directed to U.S. Appl. No. 15/818,691; 6 pages.

Baldwin et al., U.S. Office Action dated Aug. 25, 2016, directed to U.S. Appl. No. 14/144,986; 6 pages.

Baldwin et al., U.S. Office Action dated Dec. 27, 2017, directed to U.S. Appl. No. 15/581,503; 6 pages.

Baldwin et al., U.S. Office Action dated Jan. 25, 2017, directed to U.S. Appl. No. 14/144,345; 15 pages.

Baldwin et al., U.S. Office Action dated May 17, 2018, directed to U.S. Appl. No. 14/586,781; 9 pages.

Baldwin et al., U.S. Office Action dated May 2, 2016, directed to U.S. Appl. No. 14/144,345; 18 pages.

Baldwin et al., U.S. Office Action dated Oct. 3, 2016, directed to U.S. Appl. No. 14/586,745; 8 pages.

Baldwin et al., U.S. Office Action dated Oct. 6, 2016, directed to U.S. Appl. No. 14/586,721; 7 pages.

Baldwin et al., U.S. Office Action dated Oct. 6, 2017, directed to U.S. Appl. No. 14/586,781; 8 pages.

Baldwin et al., U.S. Appl. No. 14/144,986, filed Dec. 31, 2013; 37 pages.

Notification of Second Office Action dated Apr. 18, 2018, directed to CN Application No. 201480074773.2; 7 pages.

Notification of First Office Action dated Aug. 1, 2017, directed to CN Application No. 201480074773.2; 21 pages.

European Search Report dated Sep. 14, 2018, directed to European Patent Application No. 15876173.4; 18 pages.

Extended European Search Report dated Sep. 13, 2018, directed to European Application No. 18180821.3; 7 pages.

Extended European Search Report dated Aug. 23, 2017, directed to European Application No. 14876099.4; 9 pages.

International Search Report and Written Opinion dated Mar. 25, 2015, directed to International Application No. PCT/US2014/72548; 10 pages.

International Search Report and Written Opinion dated May 20, 2016, directed to International Application No. PCT/US2015/67875; 14 pages.

Office Action dated Aug. 13, 2018, directed to Japanese Application No. 2016-544141; 7 pages.

Notification of First Office Action dated Nov. 21, 2018, directed to CN Application No. 201580071862.6; 49 pages.

Baldwin et al., U.S. Office Action dated Nov. 22, 2019 directed to U.S. Appl. No. 15/590,836; 39 pages.

Ben-Daat et al., U.S. Office Action dated Aug. 22, 2019 directed to U.S. Appl. No. 15/476,681; 20 pages.

Notification of the Second Office Action dated Sep. 11, 2019, directed to CN Application No. 201580071862.6; 18 pages.

Ben-Daat et al., U.S. Office Action dated Apr. 29, 2020, directed to U.S. Appl. No. 15/476,681; 17 pages.

Ben-Daat et al., U.S. Office Action dated Jan. 10, 2020, directed to U.S. Appl. No. 15/476,681; 16 pages.

Ben-Daat et al., U.S. Office Action dated Jul. 7, 2020, directed to U.S. Appl. No. 16/370,043; 12 pages.

International Search Report and Written Opinion dated Jun. 18, 2020, directed to International Application No. PCT/US2020/025480; 14 pages.

Notification of the First Office Action dated Mar. 19, 2020, directed to Chinese Application No. 201810692634.6; 18 pages.

Office Action dated Jan. 6, 2020, directed to Japanese Application No. 2017-535371; 4 pages.

Notification of the First Office Action dated Mar. 3, 2021, directed to Chinese Application No. 201810228470.1; 24 pages.

\* cited by examiner

METHOD OF MAKING COEXTRUDED, CROSS-LINKED POLYOLEFIN FOAM WITH TPU CAP LAYERS

FIELD OF THE DISCLOSURE

This disclosure relates to multilayer foam structures with a TPU cap layer. More specifically, this disclosure relates to a physically crosslinked, closed cell continuous multilayer foam structure comprising a TPU cap layer.

BACKGROUND

Polyolefin foams can be used in various applications such as a trim component in a vehicle interior, a flooring underlayment, a tape, and a gasket. When used in these various applications, the polyolefin foam can be bonded to urethane based adhesives, polyurethane foams, and reacting urethane foams. Traditionally, to obtain satisfactory adhesion between polyolefin foam and (poly)urethane, a surface modification treatment such as corona, plasma, or chemical was applied to the foam.

However, surface modification of the polyolefin foam is an added processing step between the manufacturing of the foam and the final application. This can add cost which may render the process uneconomical for commercial purposes. In addition, polyolefin surface modification—particularly with corona—can also be temporary and may not be suitable for instances where the treated foam is stored in a warehouse or a retail store for an extended period of time.

SUMMARY

Applicants have discovered that coextruding a polyolefin foam composition with a TPU cap layer can overcome the issues associated with treating the surface of a polyolefin foam with corona, plasma, or a chemical to modify the foam surface. Since the TPU cap layer is urethane based, urethane based adhesives, polyurethane foams, and reacting urethane foams are expected to readily bond to the TPU cap layer without the need for a surface treatment because of the similarities in the polymeric structure of these materials. In addition, unlike corona, the TPU cap layer does not have a "shelf life" where extended periods of time in a warehouse or retail store can render the product less susceptible to adhesion to urethane based adhesives and polyurethane foams.

In some embodiments, a method of forming a multilayer structure includes coextruding: a first layer including polypropylene, polyethylene, or a combination thereof and a chemical foaming agent; and a second layer on a side of the first layer, the second layer including at least 40 wt % thermoplastic polyurethane (TPU) and polypropylene, polyethylene, or a combination thereof; irradiating the coextruded layers with ionizing radiation; and foaming the irradiated, coextruded layers. In some embodiments, the first layer comprises 5-20 wt % TPU. In some embodiments, the first layer comprises at least 70 wt % polypropylene, polyethylene, or a combination of polypropylene and polyethylene. In some embodiments, the first layer comprises additives in an amount of 1-15 wt %. In some embodiments, the second layer comprises additives in an amount of 1-8 wt %. In some embodiments, the polypropylene has a melt flow index of 0.1-25 grams per 10 minutes at 230° C. In some embodiments, the polyethylene has a melt flow index of 0.1-25 grams per 10 minutes at 190° C. In some embodiments, the amount of chemical foaming agent in the first layer is 5-10 wt %. In some embodiments, the chemical foaming agent comprises azodicarbonamide. In some embodiments, the first layer comprises a crosslinking agent. In some embodiments, the amount of crosslinking agent in the first layer is 1-3 wt %. In some embodiments, the ionizing radiation is selected from the group consisting of alpha, beta (electron beams), x-ray, gamma, and neutron. In some embodiments, the coextruded structure is irradiated up to 4 separate times. In some embodiments, the ionizing radiation is an electron beam with an acceleration voltage of 200-1500 kV. In some embodiments, an absorbed electron beam dosage is 10-500 kGy. In some embodiments, the ionizing radiation crosslinks the extruded structure to a crosslinking degree of 20-75%. In some embodiments, foaming comprises heating the irradiated structure with molten salt and radiant heaters or a hot air oven. In some embodiments, the multilayer foam structure has a density of 20-250 kg/m$^3$. In some embodiments, the multilayer foam structure has an average closed cell size of 0.05-1.0 mm. In some embodiments, the multilayer foam structure has a thickness of 0.2-50 mm.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters. For example, a statement that the layer has less than about 20 wt %, about 15 wt %, or about 10 wt % of a chemical foaming agent, is meant to mean that the weight percentage of the chemical foaming agent in the layer can be less than about 20 wt %, less than about 15 wt %, or less than about 10 wt %.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

It is understood that aspects and embodiments described herein include "consisting" and/or "consisting essentially of" aspects and embodiments. For all methods, systems, compositions, and devices described herein, the methods, systems, compositions, and devices can either comprise the listed components or steps, or can "consist of" or "consist essentially of" the listed components or steps. When a system, composition, or device is described as "consisting essentially of" the listed components, the system, composition, or device contains the components listed, and may contain other components which do not substantially affect the performance of the system, composition, or device, but either do not contain any other components which substantially affect the performance of the system, composition, or device other than those components expressly listed; or do not contain a sufficient concentration or amount of the extra components to substantially affect the performance of the system, composition, or device. When a method is described as "consisting essentially of" the listed steps, the method contains the steps listed, and may contain other steps that do not substantially affect the outcome of the method, but the method does not contain any other steps which substantially affect the outcome of the method other than those steps expressly listed.

In the disclosure, "substantially free of" a specific component, a specific composition, a specific compound, or a specific ingredient in various embodiments, is meant that less than about 5%, less than about 2%, less than about 1%, less than about 0.5%, less than about 0.1%, less than about 0.05%, less than about 0.025%, or less than about 0.01% of the specific component, the specific composition, the specific compound, or the specific ingredient is present by weight. Preferably, "substantially free of" a specific component, a specific composition, a specific compound, or a specific ingredient indicates that less than about 1% of the specific component, the specific composition, the specific compound, or the specific ingredient is present by weight.

Additional advantages will be readily apparent to those skilled in the art from the following detailed description. The examples and descriptions herein are to be regarded as illustrative in nature and not restrictive.

BRIEF DESCRIPTION OF THE DRAWINGS

Exemplary embodiments are described with reference to the accompanying figures, in which.

DETAILED DESCRIPTION

Figure 1A:
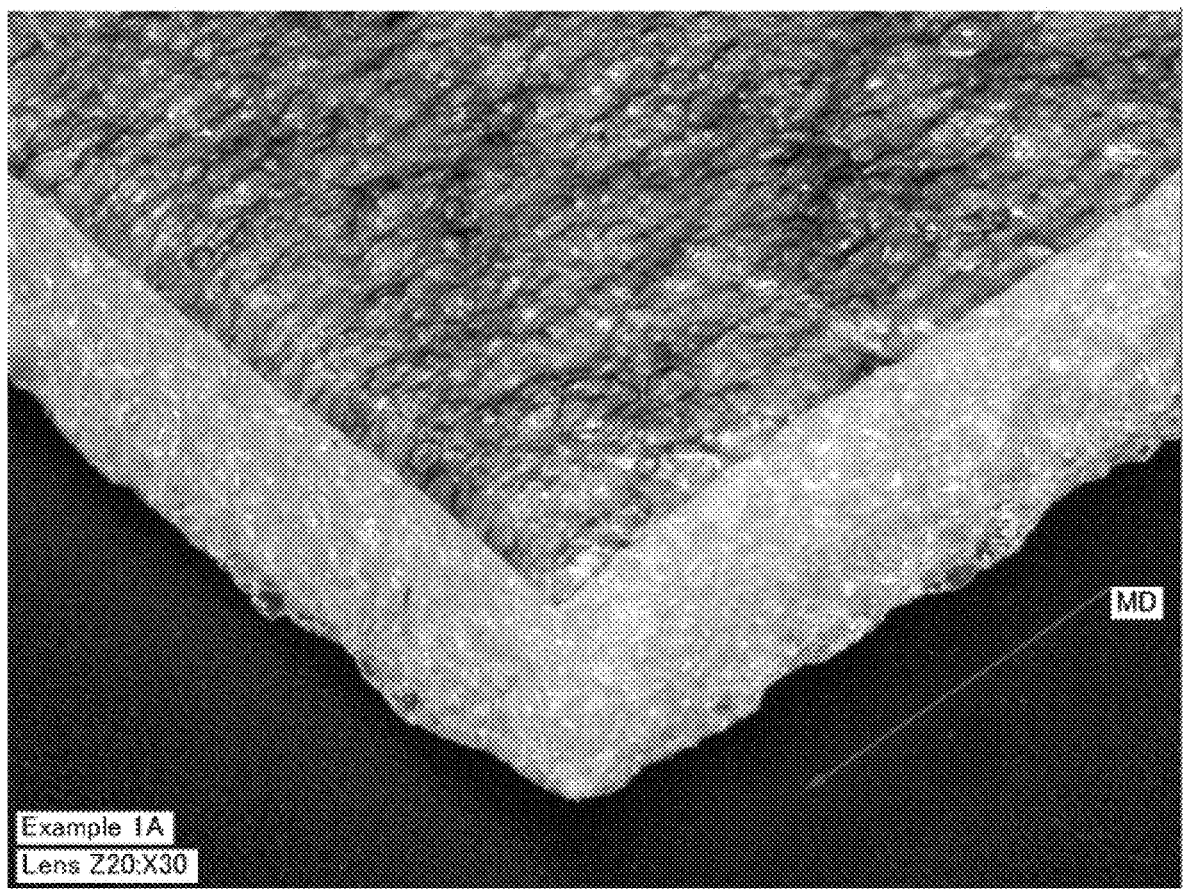
FIG. 1A is an image of Example 1A at 30× magnification and 45° from primary surface.

Described herein are crosslinked, closed cell coextruded polyolefin foams with TPU cap layers as well as methods for producing such structures. Applicants have discovered that coextruding a polyolefin foam composition with a TPU cap layer can overcome the issues associated with treating the surface of polyolefin foam with corona, plasma, or a chemical. Specifically, the structures disclosed herein can readily bond to urethane based adhesives and polyurethane foams and can avoid rendering the product less susceptible to adhesion to urethane based adhesives and polyurethane foams due to shelf life.

The methods for producing a crosslinked, closed cell co-extruded polyolefin foam with TPU cap layer(s) may include the steps of: (a) co-extrusion; (b) irradiation; and (c) foaming.

Co-extrusion is the extrusion of multiple layers of material simultaneously. This type of extrusion can utilize two or more extruders to deliver a steady volumetric throughput of material to an extrusion head (die) which can extrude the materials in the desired form. In the co-extrusion step, compositions can be fed into multiple extruders to form an unfoamed, multilayer structure. For example, an "A" foam composition can be fed into one extruder and a "B" cap composition can be fed into a second extruder. The method of feeding ingredients into the extruders can be based on the design of the extruder and the material handling equipment available. Blending ingredients of the foam and cap compositions may be performed prior to feeding into the extruders, if necessary, to facilitate their dispersal. A Henshel mixer can be used for such blending. All ingredients can be blended and fed thru a single port in an extruder. The ingredients can also be individually fed thru separate designated ports for each ingredient. For example, if the cross-linking promoter or any other additive is a liquid, the promoter and/or additives can be added through a feeding gate (or gates) on the extruder or through a vent opening on the extruder (if equipped with a vent) instead of being blended with solid ingredients. Combinations of blended ingredients and individual ingredient port feeding can also be employed.

Each extruder can deliver a steady amount of each composition into one or more manifolds followed by a sheeting die to create an unfoamed, co-extruded multilayer sheet. There are two common methods for co-extruding materials: (1) feed block manifolds; and (2) multi-manifolds within the die. Elements of a feed block manifold can include: (a) inlet ports for upper, middle, and lower layers; (b) a streamlined melt lamination area that channels separate flow streams into one laminated melt stream inside the feed block; (c) an adapter plate between the feed block and the sheet die; and/or (d) a sheet die (similar to a monolayer die), wherein the laminated melt stream enters the center of the die and spreads out along the manifold flowing out of the die exit as a distinct multilayer extrudate. Elements of a multi-manifold die can be: (a) similar to a monolayer die, except that there is more than one feed channel; (b) that each melt channel has its own choker bar for flow control; and/or (c) that the melt streams converge inside the die near the exit and emerge as a distinct multilayer extrudate.

Layer thicknesses can be determined by the design of the manifold(s) and/or die. For example, an 80/20 feed block manifold can deliver compositions in approximately a 4:1 ratio when the speed and size of each extruder is matched accordingly. This ratio can be altered by changing, for example: (a) the amount of material fed into each extruder; (b) the relative extrusion speed between one extruder and another; (c) the relative size of each extruder; and/or (d) the composition (i.e., the viscosity) of the individual layers.

The thickness of the overall multilayer sheet can be controlled by the overall die gap. However, the overall multilayer sheet thickness can further be adjusted, for example, by stretching (i.e., "drawing") the melted multilayer extrudate and/or flattening the melted multilayer extrudate through a nip.

The multilayer structures disclosed herein can include at least 2 layers made up of different compositions, where at least one of the layers can contain TPU (thermoplastic polyurethane). In addition, the multilayer structures can include at least 1 layer made up of a foamable or foamed composition. In some embodiments, the multilayer structures can include at least one "A" polyolefin foam layer and at least one "B" TPU cap layer. In some embodiments, the "B" TPU cap layer can also include polyolefin. In some embodiments, the "A" polyolefin foam layer can also include TPU. In some embodiments, the "B" TPU cap layer can also be foamable or foamed.

A foamable composition fed into the extruder can include at least one polypropylene, at least one polyethylene, or a combination thereof. In some embodiments, the foam composition can form a polyolefin foam layer (A) of the multilayered structure. In some embodiments, the foam composition can form a TPU cap layer (B) of the multilayer structure.

The polypropylene may contain an elastic or softening component, typically an ethylene or rubber component and thus includes, but is not limited to, polypropylene, impact modified polypropylene, polypropylene-ethylene copolymer, impact modified polypropylene-ethylene copolymer, metallocene polypropylene, metallocene polypropylene-ethylene copolymer, metallocene polypropylene olefin block copolymer (with a controlled block sequence), polypropylene based polyolefin plastomer, polypropylene based polyolefin elastoplastomer, polypropylene based polyolefin elastomer, polypropylene based thermoplastic polyolefin blend, and polypropylene based thermoplastic elastomeric blend. Furthermore, the polypropylene may be modified with polyether amine.

The polyethylene includes, but is not limited to, LDPE, LLDPE (homopolymer, copolymer with butene or hexene or octene, terpolymer with butene and/or hexene and/or octene), VLDPE (homopolymer, copolymer with butene or hexene or octene, terpolymer with butene and/or hexene and/or octene), VLLDPE (homopolymer, copolymer with butene or hexene or octene, terpolymer with butene and/or hexene and/or octene), HDPE, polyethylene-propylene copolymer, metallocene polyethylene, metallocene ethylene-propylene copolymer, and metallocene polyethylene olefin block copolymer (with a controlled block sequence), any of which may contain grafted compatibilizers or copolymers that contain acetate and/or ester groups. These polyethylenes may be modified with polyether amine.

The foam composition fed into the extruder can also include at least one TPU. TPU includes, but is not limited to, thermoplastic polyurethanes based on polyester, polyether, polycaprolactone, and TPU copolymers such as polycaprolactone copolyester. The TPU can be of the aromatic or aliphatic variety.

In some embodiments, the amount of at least one polypropylene and/or at least one polyethylene in a foam composition can be greater than or equal to about 70 PPHR, about 75 PPHR, about 80 PPHR, about 85 PPHR, about 90 PPHR, about 95 PPHR, or about 100 PPHR the composition. In some embodiments, the amount of at least one polypropylene and/or at least one polyethylene in a foam layer can be at least about 50 wt %, about 60 wt %, about 65 wt %, about 70 wt %, about 75 wt %, about 80 wt %, about 85 wt %, or about 90 wt % the foam layer. In some embodiments, the amount of at least one polypropylene and/or at least one polyethylene in a foam layer can be about 50-95 wt %, about 65-90 wt %, about 70-90 wt %, or about 70-85 wt % the foam layer.

In some embodiments, the amount of TPU in a foam composition can be less than or equal to about 30 PPHR, about 25 PPHR, about 20 PPHR, or about 15 PPHR the composition. In some embodiments, the TPU in a foam layer can be at most about 25 wt %, about 20 wt %, or about 15 wt % the foam layer. In some embodiments, the TPU in a foam layer can be about 0-25 wt %, about 1-22 wt %, about 5-20 wt %, about 10-20, or about 10-15 wt % the foam layer.

A cap composition fed into the extruder can include at least one TPU and at least one polypropylene and/or at least one polyethylene—the TPU, polypropylene, and polyethylene as described above. In some embodiments, the cap composition can form a TPU cap layer (B) of the multilayer structure.

In some embodiments, the amount of TPU in a cap composition can be greater than or equal to about 40 PPHR, about 50 PPHR, about 55 PPHR, about 60 PPHR, about 70 PPHR, about 75 PPHR, about 85 PPHR, about 95 PPHR, or about 100 PPHR the composition. In some embodiments, the TPU in a cap layer can be at least about 40 wt %, about 45 wt %, about 50 wt %, about 55 wt %, about 60 wt %, about 70 wt %, about 75 wt %, about 85 wt %, about 95 wt %, or about 100 wt % the cap layer. In some embodiments, the TPU in a cap layer can be about 40-85 wt %, about 55-80 wt %, or about 55-75 wt % the cap layer.

In some embodiments, the amount of at least one polypropylene and/or at least one polyethylene in a cap composition can be less than or equal to about 60 PPHR, about 55 PPHR, about 50 PPHR, about 45 PPHR, about 40 PPHR, about 30 PPHR, about 25 PPHR, about 15 PPHR, or about 5 PPHR the composition. In some embodiments, the amount of at least one polypropylene and/or at least one polyethylene in a cap layer can be at most about 60 wt %, about 55 wt %, about 50 wt %, about 45 wt %, about 40 wt %, about 30 wt %, about 25 wt %, about 15 wt %, about 10 wt %, or about 5 wt % the cap layer. In some embodiments, the amount of at least one polypropylene and/or at least one polyethylene in a cap layer can be about 15-60 wt %, about 20-45 wt %, or about 20-40 wt % the cap layer.

Since a broad range of multilayer structures and foam articles can be created with the disclosed compositions, a broad range of polypropylenes, polyethylenes, and TPU can be employed in the compositions to meet various in-process manufacturing requirements and commercial end use requirements.

Non-limiting examples of commercially available "thermoplastic polyurethane" (TPU) include, but are not limited to, the TEXIN® Series from Covestro, the ELASTOLLAN® Series from BASF, the ESTANE® Series from Lubrizol, and the IROGRAN® Series from Huntsman.

A non-limiting example of "polypropylene" is an isotactic homopolypropylene. Commercially available examples include, but are not limited to, FF018F from Braskem, 3271 from Total Petrochemicals, and COPYLENE™ CH020 from Conoco.

A non-limiting example of an "impact modified polypropylene" is a homopolypropylene with ethylene-propylene (EP) copolymer rubber. The rubber can be amorphous or semicrystalline but is not in sufficient quantities to render the material any plastomeric or elastomeric properties. A few non-limiting examples of commercially available "impact modified polypropylene" are TI4003F and TI4015F from Braskem and PRO-FAX® 8623 and PRO-FAX® SB786 from LyondellBasell.

"Polypropylene-ethylene copolymer" is polypropylene with random ethylene units. A few non-limiting examples of commercially available "polypropylene-ethylene copolymer" are 6232, 7250FL, and Z9421 from Total Petrochemicals, 6D20 and DS6D81 from Braskem. and PRO-FAX® RP311H and ADSYL™ 7415 XCP from LyondellBasell.

"Impact modified polypropylene-ethylene copolymer" is polypropylene with random ethylene units and with ethylene-propylene (EP) copolymer rubber. The rubber can be amorphous or semicrystalline, but is not in sufficient quantities to render the material any plastomeric or elastomeric properties. A non-limiting example of a commercially available impact modified polypropylene-ethylene copolymer is PRISMA® 6910 from Braskem.

"Metallocene polypropylene" is metallocene syndiotactic homopolypropylene, metallocene atactic homopolypropylene, and metallocene isotactic homopolypropylene. Non-limiting examples of "metallocene polypropylene" are those commercially available under the trade names METOCENE™ from LyondellBasell and ACHIEVE™ from ExxonMobil. Metallocene polypropylenes are also commercially available from Total Petrochemicals and include, but are not limited to, grades M3551, M3282MZ, M7672, 1251, 1471, 1571, and 1751.

"Metallocene polypropylene-ethylene copolymer" is metallocene syndiotactic, metallocene atactic, and metallocene isotactic polypropylene with random ethylene units. Commercially available examples include, but are not limited to, Lumicene® MR10MX0 and Lumicene® MR60MC2 from Total Petrochemicals and Purell® SM170G from LyondellBasell.

"Metallocene polypropylene olefin block copolymer" is a polypropylene with alternating crystallizable hard "blocks" and amorphous soft "blocks" that are not randomly distributed—that is, with a controlled block sequence. An example of "metallocene polypropylene olefin block copolymer" includes, but is not limited to, the INTUNE™ product line from the Dow Chemical Company.

"Polypropylene based polyolefin plastomer" (POP) and "polypropylene based polyolefin elastoplastomer" are both metallocene and non-metallocene propylene based copolymers with plastomeric and elastoplastomeric properties. Non-limiting examples are those commercially available under the trade name VERSIFY™ (metallocene) from the Dow Chemical Company, VISTAMAXX™ (metallocene) from ExxonMobil, and KOATTRO™ (non-metallocene) from LyondellBasell (a butene-1 based line of plastomeric polymers—certain grades are butene-1 homopolymer based and others are polypropylene-butene-1 copolymer based materials).

"Polypropylene based polyolefin elastomer" (POE) is both metallocene and non-metallocene propylene based copolymer with elastomeric properties. Non-limiting examples of propylene based polyolefin elastomers are those polymers commercially available under the trade names VERSIFY™ (metallocene) from the Dow Chemical Company and VISTAMAXX™ (metallocene) from ExxonMobil.

"Polypropylene based thermoplastic polyolefin blend" (TPO) is polypropylene, polypropylene-ethylene copolymer, metallocene homopolypropylene, and metallocene polypropylene-ethylene copolymer, which have ethylene-propylene copolymer rubber in amounts great enough to give the thermoplastic polyolefin blend (TPO) plastomeric, elastoplastomeric or elastomeric properties. Non-limiting examples of polypropylene based polyolefin blend polymers are those polymer blends commercially available under the trade names EXCELINK™ from JSR Corporation, THERMORUN™ and ZELAS™ from Mitsubishi Chemical Corporation, ADFLEX™ and SOFTELL™ from LyondellBasell, and TELCAR™ from Teknor Apex Company.

"Polypropylene based thermoplastic elastomer blend" (TPE) is polypropylene, polypropylene-ethylene copolymer, metallocene homopolypropylene, and metallocene polypropylene-ethylene copolymer, which have diblock or multiblock thermoplastic rubber modifiers (SEBS, SEPS, SEEPS, SEP, SERC, CEBC, HSB and the like) in amounts great enough to give the thermoplastic elastomer blend (TPE) plastomeric, elastoplastomeric, or elastomeric properties. Non-limiting examples of polypropylene based thermoplastic elastomer blend polymers are those polymer blends commercially available under the trade name GLS™ DYNAFLEX™ and GLS™ VERSAFLEX™ from Polyone Corporation, MONPRENE® from Teknor Apex Company, and DURAGRIP® from A. Schulman.

"VLDPE" and "VLLDPE" are very low density polyethylene and very linear density low density polyethylene containing an elastic or softening component, typically α-olefins of butene and/or hexene and/or octene. Non-limiting examples of VLDPE and VLLDPE are commercially available under the tradename FLEXOMER™ from the Dow Chemical Company and particular grades of STAMYLEX™ from Borealis.

"Metallocene polyethylene" is metallocene based polyethylene with properties ranging from non-elastic to elastomeric. Non-limiting examples of metallocene polyethylene are commercially available under the trade name ENGAGE™ from Dow Chemical Company, ENABLE™ and EXCEED™ from ExxonMobil, and QUEO™ from Borealis.

"Metallocene polyethylene olefin block copolymer" is a polyethylene with alternating crystallizable hard "blocks" and amorphous soft "blocks" that are not randomly distributed—that is, with a controlled block sequence. An example of "metallocene polyethylene olefin block copolymer" includes, but is not limited to, the INFUSE™ product line from the Dow Chemical Company.

These polyethylenes may also be copolymers and terpolymers containing acetate and/or ester groups. The comonomer groups include, but are not limited to, vinyl acetate, methyl acrylate, ethyl acrylate, butyl acrylate, glycidyl methacrylate, and acrylic acid. Non-limiting examples are commercially available under the tradename BYNEL®, ELVAX® and ELVALOY® from DuPont; EVATANE®, LOTADER®, and LOTRYL® from Arkema; ESCORENE™, ESCOR™, and OPTEMA™ from ExxonMobil.

Polyether amine modified polypropylenes and polyethylenes are produced by grafting polyether amine onto functionalized polypropylene and polyethylene. Functionalized polypropylenes and polyethylenes are where a monomer has been grafted—typically by a free radical reaction. Suitable monomers for preparing functionalized polypropylenes and polyethylenes are, for example, olefinically unsaturated monocarboxylic acids, e.g. acrylic acid or methacrylic acid, and the corresponding tert-butyl esters, e.g. tert-butyl (meth) acrylate, olefinically unsaturated dicarboxylic acids, e.g. fumaric acid, maleic acid, and itaconic acid and the corresponding mono- and/or di-tert-butyl esters, e.g. mono- or di-tert-butyl fumarate and mono- or di-tert-butyl maleate, olefinically unsaturated dicarboxylic anhydrides, e.g. maleic anhydride, sulfo- or sulfonyl-containing olefinically unsaturated monomers, e.g. p-styrenesulfonic acid, 2-(meth)acrylamido-2-methylpropenesulfonic acid or 2-sulfonyl-(meth) acrylate, oxazolinyl-containing olefinically unsaturated monomers, e.g. vinyloxazolines and vinyloxazoline derivatives, and epoxy-containing olefinically unsaturated monomers, e.g. glycidyl (meth)acrylate or allyl glycidyl ether.

The most commonly commercially available functionalized polypropylenes are the ones functionalized with maleic anhydride. Non-limiting examples are the ADMER® QF and QB Series from Mitsui Chemicals, the PLEXAR® 6000 Series from LyondellBasell, the BYNEL® 5000 Series from DuPont, and the OREVAC® PP Series from Arkema.

The most commonly commercially available functionalized polyethylenes are also the ones functionalized with maleic anhydride. Non-limiting examples are the ADMER® NF and SE Series from Mitsui Chemicals, the PLEXAR® 1000, 2000, and 3000 Series from LyondellBasell, the BYNEL® 2100, 3000, 3800, 3900, 4000 Series from DuPont, and the OREVAC® PE, T, and some of the LOTADER® Series from Arkema.

Polyethylenes functionalized with other grafted monomers are also commercially available. Non-limiting examples include the BYNEL® 1100, 2200, and 3100 Series from DuPont and the LOTADER® AX Series from Arkema.

Note that polymers other than polypropylene and polyethylene functionalized with maleic anhydride are also commercially available. For example, the ROYALTUF® Series from Addivant are a series of EPDM rubbers functionalized with maleic anhydride. In another example, the KRATON™ FG series from Kraton are a series of SEBS polymers functionalized with maleic anhydride.

Polyetheramines can then be grafted to these functional groups in any customary mixing apparatus such as an extruder, a batch mixer, a continuous mixer, or a kneader. Suitable polyether block for the polyetheramine include polyethylene glycol, polypropylene glycol, copolymers of polyethylene glycol and polypropylene glycol, poly(1,2-butylene glycol), and poly(tetramethylene glycol). The glycols can be aminated using well known methods to produce the polyetheramines. Generally, the glycols are prepared from ethylene oxide, propylene oxide, or combination thereof using well known methods such as by a methoxy or hydroxy initiated reaction. When both ethylene oxide and propylene oxide are used, the oxides can be reacted simultaneously when a random polyether is desired, or reacted sequentially when a block polyether is desired. Suitable commercially available polyetheramines include JEFFAMINE® monamines, diamines, triamines; JEFFAMINE® secondary, hindered, high-conversion, and polytetramethylene glycols (PTMEG); and ELASTAMINE® monamines; all from Huntsman. The technical brochures *The JEFFAMINE® Polyetheramines* (published May 2007 by Hunstman Corporation) and *Modification of Polyolefins with ELASTAMINE® Polyetheramines* (published October 2009 by Huntsman Corporation) illustrate the broad range of polyetheramine types which may be used for the grafting reaction. These technical brochures are hereby incorporated by reference in their entirety. Note that polyether amine modified polypropylene and polyethylene are sometimes referred to as AMAPPA (amine-maleated polypropylene adduct) and AMAPEA (amine-maleated polyethylene adduct).

The composition of any foamable layers and any cap layers can contain at least one polypropylene having a melt flow index from about 0.1 to about 25 grams per 10 minutes at 230° C. and/or at least one polyethylene having a melt flow index from about 0.1 to about 25 grams per 10 minutes at 190° C. In some embodiments, the melt flow index of the polypropylene(s) and/or polyethylene(s) is preferably from about 0.3 to about 20 grams per 10 minutes at 230° C. and at 190° C., respectively, and more preferably from about 0.5 to about 15 grams per 10 minutes at 230° C. and at 190° C., respectively. The "melt flow index" (MFI) value for a polymer is defined and measured according to ASTM D1238 at 230° C. for polypropylenes and polypropylene based materials and at 190° C. for polyethylenes and polyethylene based materials using a 2.16 kg plunger for 10 minutes. The test time may be reduced for relatively high melt flow resins.

The MFI can provide a measure of flow characteristics of a polymer and is an indication of the molecular weight and processability of a polymer material. If the MFI values are too high, which corresponds to a low viscosity, extrusion according to the present disclosure cannot be satisfactorily carried out. Problems associated with MFI values that are too high include low pressures during extrusion, problems setting the thickness profile, uneven cooling profile due to low melt viscosity, poor melt strength, and/or machine problems. Problems with MFI values that are too low include high pressures during melt processing, sheet quality and profile problems, and higher extrusion temperatures which cause a risk of foaming agent decomposition and activation.

The above MFI ranges are also important for foaming processes because they can reflect the viscosity of the material and the viscosity has an effect on the foaming. Without being bound by any theory, it is believed there are several reasons why particular MFI values are far more effective. A lower MFI material may improve some physical properties as the molecular chain length is greater, creating more energy needed for chains to flow when a stress is applied. Also, the longer the molecular chain (MW), the more crystal entities the chain can crystallize thus providing more strength through intermolecular ties. However, at too low an MFI, the viscosity becomes too high. On the other hand, polymers with higher MFI values have shorter chains. Therefore, in a given volume of a material with higher MFI values, there are more chain ends on a microscopic level relative to polymers having a lower MFI, which can rotate and create free volume due to the space needed for such rotation (e. g., rotation occurring above the $T_g$, or glass transition temperature of the polymer). This can increase the free volume and enables an easy flow under stress forces.

In addition to the polymers, the compositions fed into the extruders may also contain additives compatible with producing the disclosed multilayered structures. Common additives include, but are not limited to, organic peroxides, antioxidants, lubricants, thermal stabilizers, colorants, flame retardants, antistatic agents, nucleating agents, plasticizers, antimicrobials, fungicides, light stabilizers, UV absorbents, anti-blocking agents, fillers, deodorizers, odor adsorbers, thickeners, cell size stabilizers, metal deactivators, and combinations thereof.

In some embodiments, the amount of additive(s) other than the chemical foaming agent(s) and the crosslinking promoter(s) in a foam composition and/or a cap composition can be less than or equal to about 20 PPHR, about 15 PPHR, about 10 PPHR, about 8 PPHR, about 6 PPHR, about 5 PPHR, or about 4 PPHR the composition. In some embodiments, the amount of additive(s) other than the chemical foaming agent(s) and the crosslinking promoter(s) in a foam composition and/or a cap composition can be about 1-10 PPHR, about 1-8 PPHR, about 3-8 PPHR, about 5-8 PPHR, or about 3-5 PPHR the composition. In some embodiments, the amount of additive(s) other than the chemical foaming agent(s) and the crosslinking promoter(s) in a foam layer can be about 1-15 wt %, about 3-10 wt %, about 5-10 wt %, or about 5-7 wt % the foam layer. In some embodiments, the amount of additive(s) other than the chemical foaming agent(s) and the crosslinking promoter(s) in a cap layer can be about 1-10 wt %, about 2-6 wt %, or about 3-5 wt % the cap layer.

Regardless of how ingredients are fed into the extruders, the shearing force and mixing within an extruder can be sufficient to produce a homogenous layer. Co-rotating and counter-rotating twin screw extruders can provide sufficient shearing force and mixing thru the extruder barrel to extrude a layer with uniform properties.

Specific energy is an indicator of how much work is being applied during the extrusion of the ingredients for a layer and how intensive the extrusion process is. Specific energy is defined as the energy applied to a material being processed by the extruder, normalized to a per kilogram basis. The specific energy is quantified in units of kilowatts of applied energy per total material fed in kilograms per hour. Specific energy is calculated according to the formula:

$$\text{Specific Energy} = \frac{\text{KW(applied)}}{\text{feedrate}\left(\frac{\text{kg}}{\text{hr}}\right)}, \text{ where}$$

-continued $$KW(\text{applied}) = \frac{KW(\text{motor rating}) * (\% \text{ torque from maximum allowable in decimal form}) * RPM(\text{actual running } RPM) * 0.97(\text{gearbox efficiency})}{\text{Max } RPM(\text{capability of extruder})}$$

Specific energy is used to quantify the amount of shearing and mixing of the ingredients within the extruder. The extruders used to form the multilayer structures disclosed herein can be capable of producing a specific energy of at least about 0.090 kW·hr/kg, preferably at least about 0.105 kW·hr/kg, and more preferably at least about 0.120 kW·hr/kg.

Any foamable layer can contain a chemical foaming agent (CFA). The extrusion temperature for any foamable layer can be at least 10° C. below the thermal decomposition initiation temperature of the chemical foaming agent. If the extrusion temperature exceeds the thermal decomposition temperature of the foaming agent, then the foaming agent will decompose, resulting in undesirable "prefoaming." The extrusion temperature for any cap layer can be at least 10° C. below the thermal decomposition initiation temperature of the chemical foaming agent in any foamable layer adjacent to the cap layer. If the extrusion temperature of the cap layer exceeds the thermal decomposition temperature of the foaming agent in the adjacent layer, then the foaming agent in the adjacent layer can decompose, also resulting in undesirable "prefoaming."

The foam composition can include a variety of different chemical foaming agents. Examples of chemical foaming agents include, but are not limited to, azo compounds, hydrazine compounds, carbazides, tetrazoles, nitroso compounds, and carbonates. In addition, a chemical foaming agent may be employed alone or in any combination. One chemical foaming agent that can be used in some embodiments is azodicarbonamide (ADCA). ADCA's thermal decomposition typically occurs at temperatures between about 190 to 230° C. In order to prevent ADCA from thermally decomposing in the extruder, extruding temperature can be maintained at or below 190° C.

The amount of chemical foaming agent in a foam composition and/or a cap composition can be less than or equal to about 40 PPHR, about 30 PPHR, about 20 PPHR, about 15 PPHR, about 10 PPHR, or about 8 PPHR the composition. In some embodiments, the amount of chemical foaming agent in a foam composition and/or a cap composition can be about 1-20 PPHR, about 2-15 PPHR, about 5-10 PPHR, or about 6-8 PPHR the composition. In some embodiments, the amount of chemical foaming agent in a foam layer can be about 1-20 wt %, about 2-15 wt %, about 5-10 wt %, or about 6-8 wt %. In some embodiments, the amount of chemical foaming agent in a cap layer can be about 0.1-5 wt %, about 0.5-3 wt %, or about 1-2 wt % the cap layer. The amount of chemical foaming agent can depend on the unfoamed sheet thickness, desired foam thickness, desired foam density, materials being extruded, crosslinking percentage, type of chemical foaming agent (different foaming agents can generate significantly different quantities of gas), among others.

Note that the above listed amounts of chemical foaming agent can be specific to ADCA only. Other foaming agents can produce varying amounts of volumetric gas per mass of CFA and can be considered accordingly. For example, when comparing ADCA to the chemical foaming agent p-toluene-sulfonyl semicarbazide (TSS): if a foamable layer contains 40 PPHR ADCA, about 63 PPHR TSS would be required to generate about the same amount gas during the foaming step.

If the difference between the decomposition temperature of the thermally decomposable foaming agent and the melting point of the polymer with the highest melting point is high, then a catalyst for foaming agent decomposition may be used. Exemplary catalysts include, but are not limited to, zinc oxide, magnesium oxide, calcium stearate, glycerin, and urea. The lower temperature limit for extrusion can be that of the polymer with the highest melting point. If the extrusion temperature drops below the melting temperature of the polymer with the highest melting point, then undesirable "unmelts" appear. Upon foaming, the extruded layer that was extruded below this lower temperature limit can exhibit uneven thickness, a non-uniform cell structure, pockets of cell collapse, and other undesirable attributes.

Extruding an unfoamed multilayer sheet—versus extruding a foamed multilayer sheet (commonly referred to as "extrusion foaming")—are vastly different. Extrusion foaming can be performed with a physical foaming agent, a chemical foaming agent, or a mixture of physical and chemical. Physical foaming agents can be inorganic and organic gases (nitrogen, carbon dioxide, pentane, butane, etc.) that are injected under high pressure directly into the polymer melt. The gases can nucleate and expand as the polymer melt exits the extrusion die to create the foamed polymer. Chemical foaming agents—such as the examples previously described—can be solids that decompose exothermally or endothermally upon a decomposition temperature to produce gases. Typical gases generated from chemical foaming agents include nitrogen, carbon monoxide, carbon dioxide, ammonia, etc. To extrusion foam a chemical foaming agent, the chemical foaming agent can be dispersed in the polymer melt and the melt heated to above the decomposition temperature of the chemical foaming agent while still in the extruder and die. A foamed polymer can be made as the polymer melt exits the extrusion die.

Regardless whether the foaming agents are physical, chemical, or combinations, typical extrusion foaming generates polymer sheets where both primary surfaces are significantly rougher than equivalent structures produced in the disclosed method. The surface profile of a multilayer (as well as single layer) foam sheet can be critical in many applications and thus extrusion foamed sheets may not be used for these applications. These applications can require a smooth foam surface to obtain desired properties such as ease of lamination to a film, fabric, fiber layer, and a leather; percentage contact area in the lamination; visual aesthetics; etc. PCT Publication WO 2016109544, which is hereby incorporated in its entirety by reference, includes examples illustrating the difference in surface roughness between extrusion foamed polymer sheets and equivalent foamed polymer sheets produced by the disclosed method.

The rougher surfaces of extrusion foamed articles can be generally caused by larger sized cells (when compared to the foams produced according to the present disclosure). Although the cell size and size distribution may not be as critical in most commercial applications, because surface roughness is a function of cell size, foams with larger cells can be less desirable than foams with smaller cells for applications requiring a smooth foam surface.

The thickness of the unfoamed, coextruded multilayer structure can be about 0.1 to about 30 mm, about 0.2 to about 25 mm, about 0.3 to about 20 mm, or about 0.4 to about 15 mm. Any individual A or B layer can have a thickness of at least about 0.05 mm, at least about 0.1 mm, at least about 0.15 mm, and at least about 0.2 mm. In some embodiments, a cap layer of the unfoamed, coextruded multilayer structure can have a thickness of about 0.1-300 microns, about 25-250 microns, about 50-200 microns, about 60-150 microns, about 60-90 microns, about 80-110 microns, about 90-130 microns, or about 120-150 microns. The unfoamed cap thickness is not limited in how thin it can be in relation to the overall unfoamed coextruded multilayered sheet, and may be as thin as about 0.1 μm—the typical thickness of a very thin tie layer used in multilayered flexible packaging and barrier films. In some embodiments, a foam layer of the unfoamed, coextruded multilayer structure can have a thickness of about 0.1-5 mm, about 0.5-3 mm, about 1-2 mm, or about 1-1.5 mm.

For cases where the cap layers are either not intended to be foamed or are only lightly foamed, the cap can be thin and easily pliable when melted so as to not significantly hinder the expansion of the foamable layer(s) during the foaming step. The cap's thickness, flexibility, melt strength, and crosslinking percentage are among many physical properties that can hinder the foaming expansion of the other layer(s). Similarly, the thickness, flexibility, melt strength, and crosslinking percentage of the foamable layer(s) as well as the ultimate thickness and density of the foamed layers are also factors in whether the cap inhibits the expansion of the foamable layer(s). A general guideline for maximum cap thickness is that it should be no more than about 20%, about 15%, about 10%, or about 5% of the overall coextruded unfoamed sheet. If the cap thickness is greater than about 20% of the overall coextruded unfoamed sheet, problems with the multilayered sheet curling, buckling, and folding onto itself may occur as the multilayered sheet is heated and foamed.

After the coextruded sheet has been produced (e.g., by two extruders), the extruded multilayered sheet can be subjected to irradiation with ionizing radiation at a given exposure to crosslink the composition of the multilayered sheet, thereby obtaining an irradiated, crosslinked multilayer structure. Ionizing radiation is often unable to produce a sufficient degree of crosslinking on polypropylene(s), polypropylene based materials, some polyethylene(s), and some polyethylene based materials. Thus, a crosslinking promoter can be added to the compositions that are fed into the extruders to promote crosslinking. Polymers crosslinked by ionizing radiation are commonly referred to as "physically crosslinked".

It is important to distinguish between "physical" crosslinking and "chemical" crosslinking. In chemical crosslinking, the crosslinks are generated with crosslinking promoters but without the use or ionizing radiation. Chemical crosslinking typically involves using either peroxides, silanes, or vinylsilanes. In peroxide crosslinking processes, the crosslinking typically occurs in the extrusion die. For silane and vinylsilane crosslinking processes, the crosslinking typically occurs post extrusion in a secondary operation where the crosslinking of the extruded material is accelerated with heat and moisture. Regardless of the chemical crosslinking method, chemically crosslinked foam sheets typically exhibit primary surfaces that are significantly rougher than equivalent structures produced in the disclosed method. The surface profile of a multilayer (as well as single layer) foam sheet can be critical in many applications and thus chemically crosslinked foam sheets may not be used for these applications. These applications can require a smooth foam surface to obtain desired properties such as ease of lamination to a film, fabric, fiber layer, and a leather; percentage contact area in the lamination; visual aesthetics; etc. PCT Publication WO 2016109544 includes examples illustrating the difference in surface roughness between chemically crosslinked foamed polymer sheets and equivalent foamed polymer sheets produced by the disclosed method.

The rougher surfaces of chemically crosslinked foamed articles can be generally caused by larger sized cells (when compared to the foams produced according to the present disclosure). Although the cell size and size distribution is not critical in most commercial applications, because surface roughness is a function of cell size, foams with larger cells can be less desirable than foams with smaller cells for applications requiring a smooth foam surface.

Examples of ionizing radiation include, but are not limited to, alpha, beta (electron beams), x-ray, gamma, and neutron. Among them, an electron beam having uniform energy can be used to prepare the crosslinked polyolefin foam/TPU cap structure. Exposure time, frequency of irradiation, and acceleration voltage upon irradiation with an electron beam can vary widely depending on the intended crosslinking degree and the thickness of the multilayered structure. However, the ionizing radiation can generally be in the range of from about 10 to about 500 kGy, about 20 to about 300 kGy, or about 20 to about 200 kGy. If the exposure is too low, then cell stability may not be maintained upon foaming. If the exposure is too high, the moldability of the resulting multilayered foam structure may be poor. Moldability is a desirable property when the multilayered foam sheet is used in thermoforming applications. Also, the unfoamed sheet may be softened by exothermic heat release upon exposure to the electron beam radiation such that the structure can deform when the exposure is too high. In addition, the polymer components may also be degraded from excessive polymer chain scission.

The coextruded unfoamed multilayered sheet may be irradiated up to 4 separate times, preferably no more than twice, and more preferably only once. If the irradiation frequency is more than about 4 times, the polymer components may suffer degradation so that upon foaming, for example, uniform cells will not be created in the resulting foam layer(s). When the thickness of the extruded structure is greater than about 4 mm, irradiating each primary surface of the multilayered profile with an ionized radiation can be preferred to make the degree of crosslinking of the primary surface(s) and the inner layer more uniform.

Irradiation with an electron beam provides an advantage in that coextruded sheets having various thicknesses can be effectively crosslinked by controlling the acceleration voltage of the electrons. The acceleration voltage can generally be in the range of from about 200 to about 1500 kV, about 400 to about 1200 kV, or about 600 to about 1000 kV. If the acceleration voltage is less than about 200 kV, then the radiation may not reach the inner portion of the coextruded sheets. As a result, the cells in the inner portion can be coarse and uneven on foaming. Additionally, acceleration voltage that is too low for a given thickness profile can cause arcing, resulting in "pinholes" or "tunnels" in the foamed structure. On the other hand, if the acceleration voltage is greater than about 1500 kV, then the polymers may degrade.

Regardless of the type of ionizing radiation selected, crosslinking is performed so that the composition of the extruded structure is crosslinked about 20 to about 75% or about 30 to about 60%, as measured by the "Toray Gel Fraction Percentage Method." According to the "Toray Gel Fraction Percentage Method," tetralin solvent is used to dissolve non-crosslinked components in a composition. In principle, the non-crosslinked material is dissolved in tetralin and the crosslinking degree is expressed as the weight percentage of crosslinked material in the entire composition. The apparatus used to determine the percent of polymer crosslinking includes: 100 mesh (0.0045 inch wire diameter); Type 304 stainless steel bags; numbered wires and clips; a Miyamoto thermostatic oil bath apparatus; an analytical balance; a fume hood; a gas burner; a high temperature oven; an anti-static gun; and three 3.5 liter wide mouth stainless steel containers with lids. Reagents and materials used include tetralin high molecular weight solvent, acetone, and silicone oil. Specifically, an empty wire mesh bag is weighed and the weight recorded. For each sample, 100 milligrams±5 milligrams of sample is weighed out and transferred to the wire mesh bag. The weight of the wire mesh bag and the sample, typically in the form of thinly sliced foam cuttings, is recorded. Each bag is attached to the corresponding number wire and clips. When the solvent temperature reaches 130° C., the bundle (bag and sample) is immersed in the solvent. The samples are shaken up and down about 5 or 6 times to loosen any air bubbles and fully wet the samples. The samples are attached to an agitator and agitated for three (3) hours so that the solvent can dissolve the foam. The samples are then cooled in a fume hood. The samples are washed by shaking up and down about 7 or 8 times in a container of primary acetone. The samples are washed a second time in a second acetone wash. The washed samples are washed once more in a third container of fresh acetone as above. The samples are then hung in a fume hood to evaporate the acetone for about 1 to about 5 minutes. The samples are then dried in a drying oven for about 1 hour at 120° C. The samples are cooled for a minimum of about 15 minutes. The wire mesh bag is weighed on an analytical balance and the weight is recorded. Crosslinking is then calculated using the formula $100*(C-A)/(B-A)$, where A=empty wire mesh bag weight; B=wire bag weight+foam sample before immersion in tetralin; and C=wire bag weight+dissolved sample after immersion in tetralin.

Suitable crosslinking agents include, but are not limited to, commercially available difunctional, trifunctional, tetrafunctional, pentafunctional, and higher functionality monomers. Such crosslinking monomers are available in liquid, solid, pellet, and powder forms. Examples include, but are not limited to, acrylates or methacrylates such as 1,6-hexanediol diacrylate, 1,6-hexanediol dimethacrylate, ethylene glycol diacrylate, ethylene glycol dimethacrylate, trimethylol propane trimethacrylate, tetramethylol methane triacrylate, 1,9-nonanediol dimethacrylate and 1,10-decanediol dimethacrylate; allyl esters of carboxylic acid (such as trimellitic acid triallyl ester, pyromellitic acid triallyl ester, and oxalic acid diallyl ester); allyl esters of cyanulic acid or isocyanulic acid such as triallyl cyanurate and triallyl isocyanurate; maleimide compounds such as N-phenyl maleimide and N,N'-m-phenylene bismaleimide; compounds having at least two tribonds such as phthalic acid dipropagyl and maleic acid dipropagyl; and divinylbenzene. Additionally, such crosslinking agents may be used alone or in any combination. Divinylbenzene (DVB), a difunctional liquid crosslinking monomer, can be used as a crosslinking agent in the present disclosure.

The amount of crosslinking agent in a foam composition and/or a cap composition can be less than or equal to about 4 PPHR, about 3 PPHR, about 2.5 PPHR, about 2 PPHR, about 1.5 PPHR, about 1 PPHR, or about 0.5 PPHR the composition. In some embodiments, the amount of crosslinking agent in a foam composition and/or a cap composition can be about 0.1-5 PPHR, about 0.5-3 PPHR, about 1-3 PPHR, or about 2-3 PPHR the composition. In some embodiments, the amount of crosslinking agent in a foam layer can be about 0.5-5 wt %, about 1-3 wt %, or about 1.5-2.5 wt %, the foam layer. In some embodiments, the amount of crosslinking agent in a cap layer can be about 0.1-2 wt %, about 0.3-1 wt %, or about 0.4-0.6 wt % the cap layer.

Note that the above listed amounts of crosslinking agent can be specific to DVB only. Other crosslinking agents can be more or less efficient in crosslinking than DVB. Thus, the required quantity for another crosslinking agent should be considered accordingly. Crosslinking agents vary in crosslinking efficiency from, but not limited to, the ionizing radiation dosage, the polymers being crosslinked, the chemical structure of the monomer, the number of functional groups on the monomer, and whether the monomer is a liquid or a powder.

Crosslinks may be generated using a variety of different techniques and can be formed both intermolecularly, between different polymer molecules, and intramolecularly, between portions of a single polymer molecule. Such techniques include, but are not limited to, providing crosslinking agents which are separate from a polymer chain and providing polymer chains which incorporate a crosslinking agent containing a functional group which can form a crosslink or be activated to form a crosslink.

After irradiating the coextruded sheet, foaming may be accomplished by heating the crosslinked multilayered sheet to a temperature higher than the decomposition temperature of the thermally decomposable blowing agent. The foaming can be performed at about 200-260° C. or about 220-240° C. in a continuous process. A continuous foaming process can be preferred over a batch process for production of a continuous foam sheet.

The foaming can be typically conducted by heating the crosslinked multilayered sheet with molten salt, radiant heaters, vertical or horizontal hot air oven, microwave energy, or a combination of these methods. The foaming may also be conducted in an impregnation process using, for example, nitrogen in an autoclave, followed by a free foaming via molten salt, radiant heaters, vertical or horizontal hot air oven, microwave energy, or a combination of these methods. Optionally, before foaming, the crosslinked multilayered sheet can be softened with preheating. This can help stabilize the expansion of the structure upon foaming—particularly with thick and stiff sheets.

The density of the multilayered foam sheet can be defined and measured using section or "overall" density, rather than a "core" density, as measured by JIS K6767. The multilayered foam sheets produced using the above described method can yield foams with a section, or "overall" density of about 20-250 kg/m$^3$, about 30-125 kg/m$^3$, about 50-100 kg/m$^3$, or about 60-95 kg/m$^3$. The section density can be controlled by the amount of blowing agent and the thickness of the extruded structure. If the density of the multilayered foam sheet is less than about 20 kg/m$^3$, then the sheet may not foam efficiently due to a large amount of chemical blowing agent needed to attain the density. Additionally, if the density of the sheet is less than about 20 kg/m$^3$, then the expansion of the sheet during the foaming step may become increasingly difficult to control. Furthermore, if the density of the multilayered foam sheet is less than about 20 kg/m$^3$, then the foam may become increasingly prone to cell collapse. Thus, it may be difficult to produce a multilayered foam sheet of uniform section density and thickness at a density less than about 20 kg/m$^3$.

The multilayered foam sheet is not limited to a section density of about 250 kg/m$^3$. A foam of about with a section density of about 350 kg/m³, about 450 kg/m³, or about 550 kg/m³ may also be produced. However, it may be preferred that the foam sheet have a density of less than about 250 kg/m³ since greater densities can be generally cost prohibitive when compared to other materials which can be used in a given application.

The foam layers produced using the above method may have closed cells. Preferably, at least 90% of the cells have undamaged cell walls, preferably at least 95%, and more preferably more than 98%. The average cell size can be from about 0.05 to about 1.0 mm, and preferably from about 0.1 to about 0.7 mm. If the average cell size is lower than about 0.05 mm, then the density of the foam structure can typically be greater than 250 kg/m³. If the average cell size is larger than 1 mm, the foam may have an uneven surface. There is also a possibility of the foam structure being undesirably torn if the population of cells in the foam does not have the preferred average cell size. This can occur when the foam structure is stretched or portions of it are subjected to a secondary process. The cell size in the foam layer(s) may have a bimodal distribution representing a population of cells in the core of the foam structure which are relatively round and a population of cells in the skin near the surfaces of the foam structure which are relatively flat, thin, and/or oblong.

The overall thickness of the multilayered polyolefin foam/TPU cap sheet can be about 0.2 mm to about 50 mm, about 0.4 mm to about 40 mm, about 0.6 mm to about 30 mm, or about 0.8 mm to about 20 mm. If the thickness is less than about 0.2 mm, then foaming may not be efficient due to significant gas loss from the primary surface(s). If the thickness is greater than about 50 mm, expansion during the foaming step can become increasingly difficult to control. Thus, it can be increasingly more difficult to produce a multilayered polyolefin foam/TPU cap sheet with uniform section density and thickness. In some embodiments, a cap layer of the foamed, coextruded multilayer structure can have a thickness of about 0.1-100 microns, about 1-100 microns, about 5-75 microns, about 10-60 microns, about 15-50 microns, about 15-25 microns, about 20-50 microns, about 20-35 microns, or about 25-30 microns. In some embodiments, a foam layer of the foamed, coextruded multilayer structure can have a thickness of about 0.1-5 mm, about 0.5-5 mm, about 1-5 mm, about 2-5 mm, or about 2-4 mm.

In some embodiments, the desired thickness can be obtained by a secondary process such as slicing, skiving, or bonding. Slicing, skiving, or bonding can produce a thickness range of about 0.1 mm to about 100 mm.

For the cap layer(s) intended to be unfoamed or lightly foamed, the thickness of the cap layer may be reduced upon foaming of the multilayered sheet. This can be due to the foamable layer(s) expanding and consequently stretching the cap layer(s). Thus, for example, if the multilayered sheet expands to twice its original area, the cap thickness can be expected to be about halved. If the multilayered sheet expands to four times its original area, the cap thickness can be expected to be reduced to about one-quarter of its original thickness.

The disclosed multilayered polyolefin foam/TPU cap sheets can be used for applications where adhesion to urethane based adhesives is required. Urethane based adhesives are used, for example, on: foam tapes and gaskets; flooring underlayment foams; foams laminated to a film, a fabric, a fiber layer, and a leather; and foam adhered to a substrate.

Closed cell foam tape is commonly used in areas such as window glazing, where strips of foam tape are placed between two window panes to seal the air between the glass. This can improve the thermal insulation property of the window. The foam can also act as a cushion for the glass panes from the effects of thermal expansion and contraction of the building and window frame from daily and seasonal temperature changes. Likewise, closed cell foam gaskets are commonly used for sealing and cushioning. Handheld electronic devices and household appliances are two examples that may contain foam gaskets. A soft, flexible foam sheet can be usually suited as a tape or gasket.

When the multilayered foam sheet is to be used as a tape or gasket, a pressure sensitive adhesive layer may be disposed on at least a portion of a TPU cap layer. Any pressure sensitive adhesive known in the art may be used. Examples of such pressure sensitive adhesives include, but are not limited to, acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing. However, polyurethanes are particularly well suited for bonding to the TPU cap layer.

Some embodiments include a first layer of the disclosed multilayer foam structure and a second layer selected from the group consisting of a solid hardwood floor panel, an engineered wood floor panel, a laminate floor panel, a vinyl floor tile, a ceramic floor tile, a porcelain floor tile, a stone floor tile, a quartz floor tile, a cement floor tile, and a concrete floor tile. In these laminates, the first layer may be joined to the adjacent panel or tile by means of chemical bonds, mechanical means, or a combination thereof. The adjacent laminate layers may also be affixed to each other by any other means including the use of attractive forces between materials having opposite electromagnetic charges or attractive forces present between materials which both have either a predominantly hydrophobic character or a predominantly hydrophilic character.

A method of attaching the disclosed multilayer foam to a floor panel—particularly a solid hardwood floor panel, an engineered wood floor panel, and a laminate floor panel—can be via a pressure sensitive adhesive layer that can be disposed on at least a portion of the cap surface and/or panel surface. Any pressure sensitive adhesive known in the art may be used. Examples of such pressure sensitive adhesives are acrylic polymers, polyurethanes, thermoplastic elastomers, block copolymers, polyolefins, silicones, rubber based adhesives, copolymers of ethylhexylacrylate and acrylic acid, copolymers of isooctyl acrylate and acrylic acid, blends of acrylic adhesives and rubber based adhesives as well as combinations of the foregoing. However, polyurethanes are particularly well suited for bonding to the TPU cap layer.

In another embodiment, the disclosed multilayer foam can be attached to a floor panel—particularly a solid hardwood floor panel, an engineered wood floor panel, and a laminate floor panel—via a pressure sensitive adhesive layer that can be disposed on at least a portion of the foam surface (rather than the cap surface) and/or panel surface. In this embodiment, the cap layer is exposed. End users (flooring installers) who use one component urethane adhesives and two component urethane adhesives can attain improved adhesion to the subfloor versus foams without a TPU cap layer.

The multilayer foam attached to the floor panel—particularly a solid hardwood floor panel, an engineered wood floor panel, and a laminate floor panel—can serve several purposes. The foam can reduce the reflected sound pressure level when the panel is impacted, for example, when walking on the panel with boots or high heeled shoes. The foam can also act as a moisture vapor barrier between the panel and sub-floor and can help provide a more uniform laydown among multiple panels since any unevenness, bumps, or spikes (for example a protruding nailhead) on the sub-floor will be buffered by the foam. These floor panels and tiles are commonly installed in residential homes, office buildings, and other commercial buildings.

Another embodiment can provide a flooring system including: a top floor layer; a sub-floor layer; and one or more underlayment layers where at least one of the underlayment layers contains the disclosed multilayer foam structure disposed between the sub-floor and the top floor layer. In this system, the foam layer may or may not be joined to any adjacent layer, including the sub-floor or the top floor layer. The attachment can be performed by means of chemical bonds, mechanical means, or combinations thereof. The adjacent layers may also be affixed to each other by any other means including the use of attractive forces between materials having opposite electromagnetic charges or attractive forces present between materials which both have either a predominantly hydrophobic character or a predominantly hydrophilic character. A method of attachment can be the use of either a one component urethane adhesive, a two component urethane adhesive, a one component acrylic adhesive, or a two component acrylic adhesive. Among these adhesives, the polyurethanes are particularly well suited for bonding to the TPU cap layer. The adhesive can be applied during the installation of the system in residential homes, office buildings, and commercial buildings.

The foam in this system can serve several purposes. The foam can reduce the reflected sound pressure level when the top floor layer is impacted, for example, when walking on the panel with boots or high heeled shoes. The foam can also act as a moisture vapor barrier between the panel and sub-floor and help provide a more uniform laydown among multiple panels since any unevenness, bumps, or spikes (for example a protruding nailhead) on the sub-floor will be buffered by the foam. For cases where the top floor layer is composed of ceramic floor tiles, porcelain floor tiles, stone floor tiles, quartz floor tiles, cement floor tiles, and concrete floor tiles connected by grout and where all layers in the flooring system are joined, the foam can help reduce grout fracturing by buffering varying thermal expansions and contractions of the various layers in the system.

In some embodiments, the multilayer foam structures are laminates containing the multilayer foam and a laminate layer. Preferably, the laminate layer can be applied to the TPU cap side of the multilayer foam. In these laminates, the multilayer foam structure can, for example, be combined with a film and/or foil. Examples of suitable materials for such layers include, but are not limited to, polyvinyl chloride (PVC); thermoplastic polyolefin (TPO); thermoplastic urethane (TPU); fabrics such as polyester, polypropylene, cloth and other fabrics; leather and/or fiber layers such as non-wovens. However, thermoplastic urethanes are particularly well suited for bonding to the TPU cap layer. Such layers may be manufactured using standard techniques that are well known to those of ordinary skill in the art. Importantly, the multilayer foam of the disclosure may be laminated on one or both sides with these materials and may include multiple other layers. If the multilayer foam is laminated on both sides, preferably these laminate layers can be applied to cap layers of the multilayer foam.

In another embodiment, the multilayer foam structures are laminates containing the multilayer foam and a polyurethane foam. Preferably, the polyurethane foam layer can be applied to the TPU cap side of the multilayer foam structure. The multilayered foam and the polyurethane foam can be bonded in, for example, a flame lamination machine, where a controlled flame melts the surface of the polyurethane foam followed by immediate contact (typically with compression, such as a nip) of the multilayered foam/cap structure and the polyurethane foam. Also typical in this embodiment is that either the multilayered polyolefin foam/cap structure or the polyurethane foam can be a laminate combined with a film and/or foil. Examples of suitable materials for such layers include, but are not limited to, polyvinyl chloride (PVC); thermoplastic polyolefin (TPO); thermoplastic urethane (TPU); fabrics such as polyester, polypropylene, cloth and other fabrics; leather and/or fiber layers such as non-wovens. Such layers—particularly when laminated to the polyurethane foam—can be laminated on the same flame lamination machine. The layer can be laminated to the polyurethane foam ahead of time, on the same pass, or afterwards.

In another embodiment, the multilayer polyolefin foam/TPU cap structure may be used in reaction injection molding (RIM). In a RIM process, the multilayer foam structure can be typically a laminate containing the multilayer foam structure and a laminate layer of, for example, polyvinyl chloride (PVC); thermoplastic polyolefin (TPO); thermoplastic urethane (TPU); fabrics such as polyester, polypropylene, cloth and other fabrics; leather and/or fiber layers such as non-wovens. A TPU cap layer of the laminated multilayer foam structure can preferably be placed in the mold with the TPU cap layer exposed to the injection side of the mold. (Typically, hard plastic substrates, metal or plastic frames, etc. are also placed in the mold prior to injection.) Two parts of a polymer can be typically mixed together under high pressure in an in-line static or impinging mixer and then injected into the mold, filling the mold cavity as the mixture reacts and further polymerizes. Two component polyurethane foam systems are the most common in commercial RIM manufacturing. The TPU cap layer can be well suited for good bonding with the injected polyurethane foam. However, other two component systems such as, but not limited to, polyureas, polyisocyanurates, and polyepoxides may also be used.

The multilayer foam structures can also be thermoformed. To thermoform the multilayer foam structure, the foam can be heated to the melting point of the blend for all the layers in the multilayer foam/TPU cap structure. If any layer has immiscible polymers, the multilayer foam structure may exhibit more than one melting point. In this case, the multilayer foam structure can typically be thermoformed when the foam is heated to a temperature midway between the multilayer foam composition's lowest melting point and highest melting point. In addition, the multilayer foam structure can be thermoformed onto a substrate such as a hard polypropylene, ABS, or wood fiber composite. In cases where the substrate is ABS or a wood fiber composite, a heat activated adhesive may be used to improve the bonding of the substrate to a cap layer. Of the various adhesives, polyurethanes are particularly well suited for bonding to the TPU cap layer. The substrate itself can also be thermoformed at the same time as the multilayer foam structure.

In some embodiments, the multilayer foam structures or laminates (which may or may not be thermoformed) can be used in automobile interior parts such as door panels, door rolls, door inserts, door stuffers, trunk stuffers, armrests, center consoles, seat cushions, seat backs, headrests, seat back panels, instrument panels, knee bolsters, or a headliner. These multilayer foam structures or laminates (which may or may not be thermoformed) can also be used in furniture (e.g., commercial, office, and residential furniture) such as chair cushions, chair backs, sofa cushions, sofa trims, recliner cushions, recliner trims, couch cushions, couch trim, sleeper cushions, or sleeper trims. These multilayer foam laminates or structures (which may or may not be thermoformed) can also be used in walls such as modular walls, moveable walls, wall panels, modular panels, office system panels, room dividers, or portable partitions. The multilayer foam laminates or structures can also be used in storage casing (e.g., commercial, office and residential) which can be either mobile or stationary. Furthermore, the multilayer foam laminates and structures (which may or may not be thermoformed) can also be used in coverings such as chair cushion coverings, chair back coverings, armrest coverings, sofa coverings, sofa cushion coverings, recliner cushion coverings, recliner coverings, couch cushion coverings, couch coverings, sleeper cushion coverings, sleeper coverings, wall coverings, and architectural coverings.

To satisfy the requirements of any of the above applications, the disclosed structures of the present disclosure may be subjected to various secondary processes, including and not limited to, embossing, corona or plasma treatment, surface roughening, surface smoothing, perforation or microperforation, splicing, slicing, skiving, layering, bonding, and hole punching.

EXAMPLES

Raw Materials for Examples

The following Table 1 provides a list of various components and descriptions of those components used in the following Examples.

TABLE 1

| Component | Type | Manufacturer | MFI | Description |
|---|---|---|---|---|
| Texin ® 1210 000000 | TPU (polyester based) | Covestro | about 8 (8.7 kg, 190° C.) | commercially produced |
| 6232 | PP/PE random copolymer | Total Petrochemicals | 1.3-1.6 (2.16 kg, 230° C.) | commercially produced |
| Infuse ™ OBC 9107 | OBC (PE/octene copolymer based) | Dow | 0.75-1.25 (2.16 kg, 190° C.) | commercially produced olefin block copolymer |
| Adflex ™ Q100F | rTPO (PP/PE random copolymer based) | LyondellBasell | 0.5-0.7 (2.16 kg, 230° C.) | commercially produced reactor thermoplastic polyolefin |
| "AMAPPlex 1x" | AMAPPA (amine-maleated polypropylene adduct) | Toray Plastics (America) | — | produced by feeding PLEXAR ® PX6006 at 95.5%, "PR023" at 3.2%, and Jeffamine ® M-2070 at 1.3% into a co-rotating twin screw extruder where the polymer melt temperature was 173-175° C. |
| "AMAPPlex 2x" | AMAPPA (amine-maleated polypropylene adduct) | Toray Plastics (America) | — | produced by feeding PLEXAR ® PX6006 at 94.3%, "PR023" at 3.2%, and Jeffamine ® M-2070 at 2.5% into a co-rotating twin screw extruder where the polymer melt temperature was 173-175° C. |
| "AMAPPlex 3x" | AMAPPA (amine-maleated polypropylene adduct) | Toray Plastics (America) | — | produced by feeding PLEXAR ® PX6006 at 93.2%, "PR023" at 3.1%, and Jeffamine ® M-2070 at 3.7% into a co-rotating twin screw extruder where the polymer melt temperature was 173-175° C. |
| Azofoam ® TC-18I | chemical foaming agent (ADCA) | P.T. Lauten Otsuka Chemical | — | commercially produced azodicarbonamide |
| DVB HP | crosslinking promotor | Dow | — | commercially produced, 80% DVB content |
| "PR023" | anti-oxidant package (LDPE carrier) | Techmer PM | — | a Toray Plastics (America) standard antioxidant package for polyolefin foam, compounded by Techmer PM, consisting of 14% antioxidants, 0.35% calcium stearate, and 85.65% low density polyethylene (LDPE) carrier resin |
| TPM11166 | processing aid (LLDPE/butene copolymer carrier) | Techmer PM | — | commercially produced extrusion processing aid blend |
| 9040 | black concentrate (PE/methyl acrylate copolymer carrier) | Modern Dispersions | — | commercially produced color concentrate, 40% carbon black loading, 19 Nm typical carbon black particle size |

Film Conversion Process for Examples

The following Table 2 provides the formulations for Examples 1-3.

TABLE 2

| | | FORMULATIONS resins (PPHR & overall %) | | | | | | |
|---|---|---|---|---|---|---|---|---|
| example ID | layer ID | TPU (polyester based) Texin ® 1210000000 | PP/PE random copolymer 6232 | OBC (PE/octene copolymer based) Infuse ™ OBC 9107 | rTPO (PP/PE random copolymer based) Adflex ™ Q100F | AMAPPA "AMAPPlex 1x" | AMAPPA "AMAPPlex 2x" | AMAPPA "AMAPPlex 3x" |
| Example 1a | "B" cap layer | 75 72.36% | | | | 25 24.12% | | |
| | "A" layer (foamed) | | 25 21.32% | 40 34.12% | 10 8.53% | 25 21.32% | | |
| Example 1b | "B" cap layer | 75 72.36% | | | | | | 25 24.12% |
| | "A" layer (foamed) | | 25 21.32% | 40 34.12% | 10 8.53% | | | 25 21.32% |
| Example 2 | "B" cap layer (foamed) | 60 56.11% | 5 4.68% | 8 7.48% | 2 1.87% | | | 25 23.38% |
| | "A" layer (foamed) | | 25 21.32% | 40 34.12% | 10 8.53% | | | 25 21.32% |
| Example 3 | "B" cap layer | 75 72.36% | | | | | 25 24.12% | |
| | "A" layer (foamed) | 15 13.02% | 20 17.35% | 32 27.77% | 8 6.94% | | 25 21.69% | |

| | | FORMULATIONS additives (PPHR & overall %) | | | | |
|---|---|---|---|---|---|---|
| example ID | layer ID | chemical foaming agent (ADCA) Azofoam ® TC-18I | x-linking promotor DVB HP | anti-oxidant package (LDPE carrier) "PR023" | processing aid (LLDPE/ butene copolymer carrier) TPM11166 | black concentrate (PE/methyl acrylate copolymer carrier) 9040 |
| Example 1a | "B" cap layer | | | 0.4 0.39% | 2 1.93% | 1.25 1.21% |
| | "A" layer (foamed) | 7.25 6.18% | 2.5 2.13% | 5.5 4.69% | 2 1.71% | |
| Example 1b | "B" cap layer | | | 0.4 0.39% | 2 1.93% | 1.25 1.21% |
| | "A" layer (foamed) | 7.25 6.18% | 2.5 2.13% | 5.5 4.69% | 2 1.71% | |
| Example 2 | "B" cap layer (foamed) | 1.78 1.66% | 0.5 0.47% | 1.5 1.40% | 1.9 1.78% | 1.25 1.17% |
| | "A" layer (foamed) | 7.25 6.18% | 2.5 2.13% | 5.5 4.69% | 2 1.71% | |
| Example 3 | "B" cap layer | | | 0.4 0.39% | 2 1.93% | 1.25 1.21% |
| | "A" layer (foamed) | 7.25 6.29% | 2 1.74% | 4.4 3.82% | 1.6 1.39% | |

The following Table 3 provides the coextrusion, irradiation, and properties of the multilayer structure of Examples 1-3.

TABLE 3

| | | COEXTRUSION | | | | |
|---|---|---|---|---|---|---|
| example ID | layer ID | type | extruder | specific energy of extrusion (kW · hr/kg) | temp. (° F.) | unfoamed sheet thickness |
| Example 1a | "B" cap layer | 80/20 feed block manifold | co-rotating twin screw | 0.136 | 347 | 80-110 μm |

TABLE 3-continued

| example ID | layer ID | | | | dosage | voltage | thickness |
|---|---|---|---|---|---|---|---|
| | "A" layer (foamed) | | | co-rotating twin screw | 0.144 | 323 | 1.22 mm |
| Example 1b | "B" cap layer | 80/20 feed block manifold | | co-rotating twin screw | 0.131 | 347 | 90-130 μm |
| | "A" layer (foamed) | | | co-rotating twin screw | 0.141 | 325 | 1.39 mm |
| Example 2 | "B" cap layer (foamed) | 80/20 feed block manifold | | co-rotating twin screw | 0.168 | 334 | 120-150 μm |
| | "A" layer (foamed) | | | co-rotating twin screw | 0.146 | 326 | 1.45 mm |
| Example 3 | "B" cap layer | 80/20 feed block manifold | | co-rotating twin screw | 0.149 | 344 | 60-90 μm |
| | "A" layer (foamed) | | | co-rotating twin screw | 0.137 | 325 | 1.37 mm |

| | | IRRADIATION | | | FOAMING | | | |
| | | | | | | | | overall gel (%) |
| example ID | layer ID | which layer facing radiation source? | dosage (kGy) | voltage (kV) | foaming temp. (° F.) | type | thickness | overall density (kg/m³) | (Toray Gel Fraction Percentage Method) |
|---|---|---|---|---|---|---|---|---|---|
| Example 1a | "B" cap layer | | 45.2 | 700 | 496 | hot air oven | 20-50 μm | 63.6 | 40.7% |
| | "A" layer (foamed) | towards IR | | | | | 3.66 mm | | |
| Example 1b | "B" cap layer | | 45.2 | 700 | 450 | molten salt & radiant heaters, cap layer facing radiant heaters and foam layer floating on salt | 25-30 μm | 67.7 | 45.5% |
| | "A" layer (foamed) | towards IR | | | | | 2.42 mm | | |
| Example 2 | "B" cap layer (foamed) | | 45.2 | 700 | 450 | molten salt & radiant heaters, cap layer facing radiant heaters and foam layer floating on salt | 20-35 μm | 70.2 | 45.6% |
| | "A" layer (foamed) | towards IR | | | | | 2.39 mm | | |
| Example 3 | "B" cap layer | | 45.2 | 700 | 450 | molten salt & radiant heaters, cap layer facing radiant heaters and foam layer | 15-25 μm | 90.7 | 47.4% |
| | "A" layer (foamed) | towards IR | | | | | 2.27 mm | | |

TABLE 3-continued floating
on salt

Figure 1B:
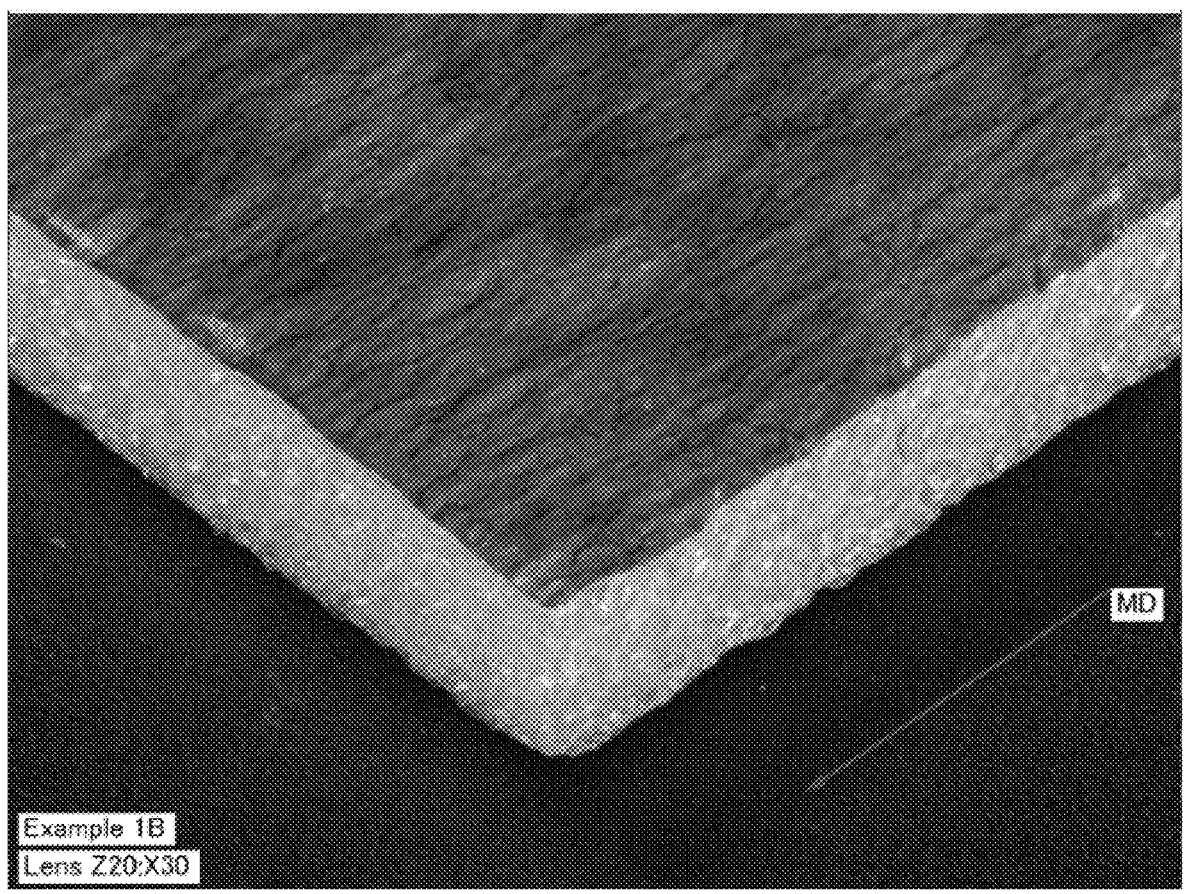
FIG. 1B is an image of Example 1B at 30× magnification and 45° from primary surface.
Figure 2:
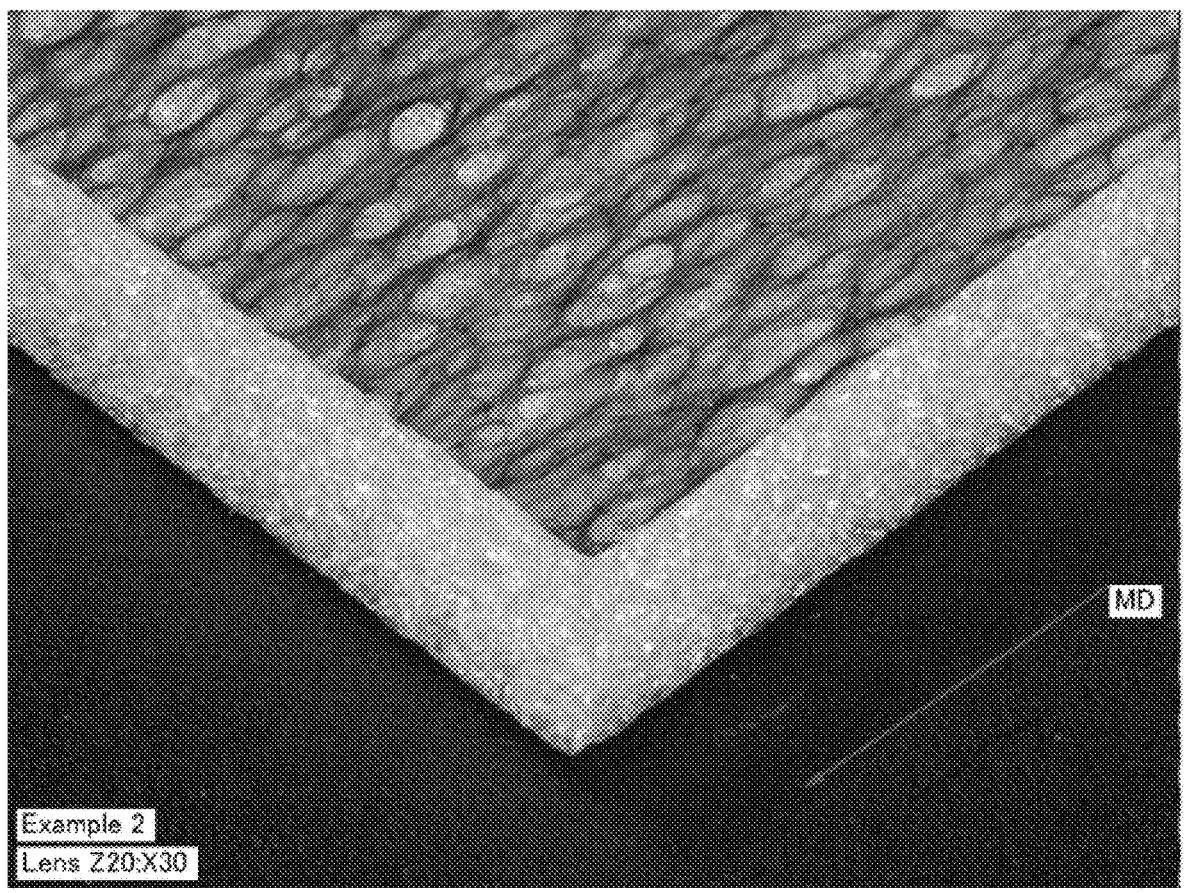
FIG. 2 is an image of Example 2 at 30× magnification and 45° from primary surface.
Figure 3:
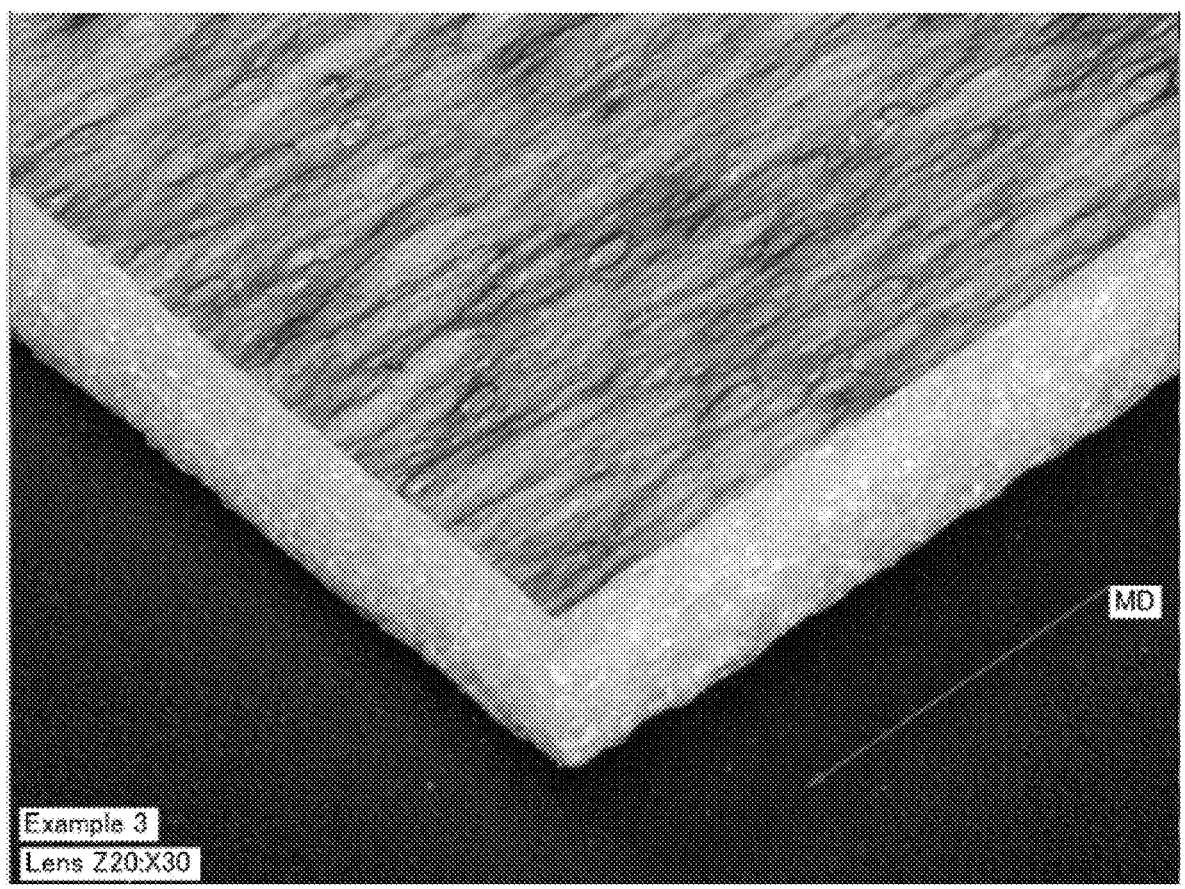
FIG. 3 is an image of Example 3 at 30× magnification and 45° from primary surface.

Images of the multilayered structures of Examples 1A, 1B, 2, and 3 at 30× magnification and 45° from primary surface can be found in FIGS. 1A, 1B, 2, and 3, respectively.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A method of forming a multilayer structure comprising:
coextruding:
a first layer comprising:
polypropylene, polyethylene, or a combination of polypropylene and polyethylene;
a chemical foaming agent; and
a second layer on a side of the first layer, the second layer comprising:
at least 55 wt % thermoplastic polyurethane (TPU); and
20-25 wt. % polyether amine modified polypropylene, polyether amine modified polyethylene, or a combination of polyether amine modified polypropylene and polyether amine modified polyethylene;
irradiating the coextruded layers with ionizing radiation; and
foaming the irradiated, coextruded layers.

2. The method of claim 1, wherein the first layer comprises 5-20 wt % TPU.

3. The method of claim 1, wherein the first layer comprises at least 70 wt % polypropylene, polyethylene, or a combination of polypropylene and polyethylene.

4. The method of claim 1, wherein the first layer comprises additives in an amount of 1-15 wt %.

5. The method of claim 1, wherein the second layer comprises additives in an amount of 1-8 wt %.

6. The method of claim 1, wherein the amount of chemical foaming agent in the first layer is 5-10 wt %.

7. The method of claim 1, wherein the chemical foaming agent comprises azodicarbonamide.

8. The method of claim 1, wherein the first layer comprises a crosslinking agent.

9. The method of claim 8, wherein the amount of crosslinking agent in the first layer is 1-3 wt %.

10. The method of claim 1, wherein the ionizing radiation is selected from the group consisting of alpha, beta (electron beams), x-ray, gamma, and neutron.

11. The method of claim 1, wherein the coextruded structure is irradiated up to 4 separate times.

12. The method of claim 10, wherein the ionizing radiation is an electron beam with an acceleration voltage of 200-1500 kV.

13. The method of claim 12, wherein an absorbed electron beam dosage is 10-500 kGy.

14. The method of claim 1, wherein the ionizing radiation crosslinks the extruded structure to a crosslinking degree of 20-75%.

15. The method of claim 1, wherein foaming comprises heating the irradiated structure with molten salt and radiant heaters or a hot air oven.

16. The method of claim 1, wherein the multilayer foam structure has a density of 20-250 kg/m3.

17. The method of claim 1, wherein the multilayer foam structure has an average closed cell size of 0.05-1.0 mm.

18. The method of claim 1, wherein the multilayer foam structure has a thickness of 0.2-50 mm.

* * * * *